(12) United States Patent
Pulliam et al.

(10) Patent No.: US 9,211,809 B2
(45) Date of Patent: Dec. 15, 2015

(54) SYSTEM AND METHOD OF VEHICLE SYSTEM CONTROL BASED ON A VEHICLE REFERENCE SPEED

(71) Applicant: General Electric Company, Schenectady, NY (US)

(72) Inventors: David Bradley Pulliam, Lawrence Park, PA (US); Ajith Kuttannair Kumar, Erie, PA (US); Bret Dwayne Worden, Erie, PA (US); Jeremy Thomas McGarry, Lawrence Park, PA (US); Kevin Ray Ruybal, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/169,459

(22) Filed: Jan. 31, 2014

(65) Prior Publication Data
US 2014/0277883 A1    Sep. 18, 2014

Related U.S. Application Data

(60) Provisional application No. 61/790,477, filed on Mar. 15, 2013.

(51) Int. Cl.
*B60L 15/20* (2006.01)
*B61C 3/00* (2006.01)
(Continued)

(52) U.S. Cl.
CPC ............ *B60L 15/20* (2013.01); *B60L 1/003* (2013.01); *B60L 1/14* (2013.01); *B60L 3/106* (2013.01); *B60L 3/108* (2013.01); *B60L 11/1803* (2013.01); *B60L 15/2009* (2013.01); *B60L 15/2045* (2013.01); *B61C 3/00* (2013.01); *B60L 2200/26* (2013.01); *B60L 2200/32* (2013.01); *B60L 2200/36* (2013.01); *B60L 2210/40* (2013.01); *B60L 2220/42* (2013.01); *B60L 2240/12* (2013.01); *B60L 2240/421* (2013.01); *B60L 2240/423* (2013.01); *B60L 2240/461* (2013.01); *B60L 2240/463* (2013.01); *B60L 2240/465* (2013.01); *B60L 2240/622* (2013.01); *B60L 2240/647* (2013.01); *B60L 2240/70* (2013.01); *B60L 2250/00* (2013.01); *B60L 2250/10* (2013.01); *B60L 2250/12* (2013.01);
(Continued)

(58) Field of Classification Search
None
See application file for complete search history.

(56) References Cited

U.S. PATENT DOCUMENTS 6,148,269 A     11/2000  Kumar
6,152,546 A *   11/2000  Daigle ......................... 303/151
(Continued)

FOREIGN PATENT DOCUMENTS

AU    2004296016 C1 *  6/2005

*Primary Examiner* — Rami Khatib
*Assistant Examiner* — Jeffrey Boomer
(74) *Attorney, Agent, or Firm* — GE Global Patent Operation; John A. Kramer

(57) ABSTRACT

A method for controlling a vehicle system includes determining a vehicle reference speed using an off-board-based input speed and an onboard-based input speed. The off-board-based input speed is representative of a moving speed of the vehicle system and is determined from data received from an off-board device. The onboard-based input speed is representative of the moving speed of the vehicle system and is determined from data obtained from an onboard device. The method includes using the vehicle reference speed to at least one of measure wheel creep for one or more wheels of the vehicle system or control at least one of torques applied by or rotational speeds of one or more motors of the vehicle system.

17 Claims, 13 Drawing Sheets

(51) Int. Cl.
  *B60L 1/14*   (2006.01)
  *B60L 3/10*   (2006.01)
  *B60L 1/00*   (2006.01)
  *B60L 11/18*  (2006.01)

(52) U.S. Cl.
  CPC .......... *B60L2260/28* (2013.01); *B60L 2260/44* (2013.01); *Y02T 10/7275* (2013.01)

(56) References Cited

U.S. PATENT DOCUMENTS

| | | | |
|---|---|---|---|
| 6,230,100 B1 * | 5/2001 | Geier | 701/466 |
| 6,499,815 B1 | 12/2002 | Daigle | |
| 6,701,228 B2 | 3/2004 | Kane | |
| 6,893,058 B2 | 5/2005 | Kumar | |
| 6,970,774 B2 | 11/2005 | Kane | |
| 7,027,900 B2 | 4/2006 | Kumar | |
| 7,084,602 B2 | 8/2006 | Donnelly | |
| 7,283,897 B2 | 10/2007 | Kane | |
| 7,285,926 B2 | 10/2007 | Daigle | |
| 7,593,795 B2 | 9/2009 | Kane | |
| 7,594,682 B2 | 9/2009 | Giammarise | |
| 2005/0065726 A1 * | 3/2005 | Meyer et al. | 701/213 |
| 2007/0001629 A1 * | 1/2007 | McGarry et al. | 318/52 |
| 2007/0233364 A1 * | 10/2007 | Kumar | 701/200 |
| 2008/0042602 A1 * | 2/2008 | Kumar | 318/66 |
| 2008/0051967 A1 * | 2/2008 | Tarnow et al. | 701/71 |
| 2009/0248226 A1 | 10/2009 | Kellner | |
| 2012/0116617 A1 * | 5/2012 | Schaffler et al. | 701/20 |
| 2012/0253565 A1 | 10/2012 | Kumar | |
| 2012/0290185 A1 * | 11/2012 | Cooper et al. | 701/93 |
| 2013/0082626 A1 | 4/2013 | Daigle | |
| 2013/0116865 A1 * | 5/2013 | Cooper et al. | 701/20 |
| 2013/0268172 A1 * | 10/2013 | Nandedkar et al. | 701/70 |

* cited by examiner

SYSTEM AND METHOD OF VEHICLE SYSTEM CONTROL BASED ON A VEHICLE REFERENCE SPEED

CROSS-REFERENCE TO RELATED APPLICATIONS

This application claims priority to U.S. Provisional Application No. 61/790,477, filed 15 Mar. 2013, and titled "System And Method For Controlling Axles Of A Vehicle System" (the "'477 Application"). This application is related to U.S. application Ser. No. 14/169,580, filed 13 Jan. 2014, and titled "System And Method For Controlling A Vehicle System" (the "'580 Application"). The entire disclosures of the '477 Application and the '580 Application are incorporated herein by reference.

BACKGROUND

1. Technical Field

Embodiments of the inventive subject matter described herein relate to controlling the speeds at which axles of a vehicle are rotated to propel the vehicle.

2. Discussion of Art

Some vehicles include powered axles that are rotated to propel the vehicles. To control the speeds at which the axles are rotated, the speed at which the vehicle is traveling is measured. For example, the axles may be rotated at speeds that are based on the measured speed of the vehicle to generate sufficient tractive effort to propel the vehicle.

Various approaches have been used to determine a speed of the vehicle. Radar systems have been used, but have been found to be unreliable and prone to mechanical failure when used with vehicles. Additionally, the radar systems have been found to have poor accuracy in measuring vehicle speeds at relatively low speeds. Wheel speed sensors have been used to measure the rotation speeds of wheels of the vehicle. But, exclusive use of these sensors may not be accurate due to slippage between the wheels and the track during motoring and/or braking. Another approach is referred to as a Sampled Axle Speed (SAS) algorithm. SAS involves decreasing the torque applied to one axle of a set of axles of the vehicle to eliminate or avoid slippage of the wheel along a track. The speed of this axle is sampled to acquire a potentially more accurate vehicle speed. This approach, however, decreases the tractive effort generated by the vehicle, and may not work well at higher acceleration rates and/or when a significantly heavy load is being hauled by the vehicle. It may be desirable to have a system and method that differs from those that are currently available.

BRIEF DESCRIPTION

In an embodiment, a method (e.g., for controlling a vehicle system) includes determining a vehicle reference speed of the vehicle system traveling along a route using an off-board-based input speed and an onboard-based input speed. The off-board-based input speed is representative of a moving speed of the vehicle system and is determined from data received from an off-board device. The onboard-based input speed is representative of the moving speed of the vehicle system and is determined from data obtained from an onboard device. The method may include, based at least in part on using the vehicle reference speed, to at least one of measure determining wheel creep for one or more wheels of the vehicle system or control controlling at least one of torques applied by or rotational speeds of one or more motors of the vehicle system.

In an embodiment, a vehicle control system includes a vehicle controller configured to obtain an off-board-based input speed and an onboard-based input speed of a vehicle system traveling along a route. The off-board-based input speed is representative of a moving speed of the vehicle system and is determined from data received from an off-board device. The onboard-based input speed is representative of the moving speed of the vehicle system and is determined from data obtained from an onboard device. The vehicle controller also is configured to use the vehicle reference speed to at least one of measure determine wheel creep for one or more wheels of the vehicle system based on the vehicle reference speed or to control at least one of torques applied by or rotational speeds of one or more motors of the vehicle system based on the vehicle reference speed.

In an embodiment, a method (e.g., for controlling a vehicle system) includes controlling a rotational speed at which a first axle of a vehicle system is rotated by a first motor based on a throttle setting of the vehicle system and a first vehicle reference speed. The first vehicle reference speed is determined from a group of input speeds that includes an onboard-based input speed and an off-board-based input speed. The method may include controlling a rotational speed at which at least a second axle of the vehicle system is rotated by a second motor based on the throttle setting and a second vehicle reference speed. The second vehicle reference speed is determined from the onboard-based input speed. The rotational speeds of the first axle and the at least a second axle are controlled based on the respective first and second vehicle reference speeds.

In an embodiment, a method includes obtaining an off-board-based input speed of a vehicle system as the vehicle system travels along a route. The off-board-based input speed is obtained from signals received from one or more off-board devices that are disposed off-board the vehicle system and is representative of a speed of the vehicle system traveling along the route. The method may include measuring one or more onboard-based input speeds of the vehicle system as the vehicle system travels along the route. The one or more onboard-based input speeds are representative of speeds at which one or more wheels of the vehicle system rotate as the vehicle system travels along the route. The method further includes determining a first vehicle reference speed from a group of input speeds that includes at least one of the non-satellite-based input speeds and an estimated velocity of the vehicle system that is derived from the satellite-based input speed. The method includes determining a second vehicle reference speed from the one or more non-satellite-based input speeds and controlling a speed at which a first axle of the vehicle system is rotated by a first motor based on a throttle setting of the vehicle system and the first vehicle reference speed. The method further includes controlling a speed at which at least a second axle of the vehicle system is rotated by a second motor based on the throttle setting and the second vehicle reference speed. The speeds of the first axle and the at least a second axle are concurrently controlled based on the respective first and second vehicle reference speeds.

In an embodiment, a vehicle control system includes a vehicle controller, one or more speed sensors, and one or more inverter controllers. The vehicle controller is configured to obtain a satellite-based input speed of a vehicle system as the vehicle system travels along a route. The satellite-based input speed is obtained from signals received from one or more satellites and representative of a speed of the vehicle system traveling along the route. The one or more speed sensors are configured to measure one or more non-satellite-based input speeds of the vehicle system as the vehicle system travels along the route. The one or more non-satellite-based input speeds are representative of speeds at which one or more wheels of the vehicle system rotate as the vehicle system travels along the route. The one or more inverter controllers are configured to control speeds at which at least first and second axles of the vehicle system are rotated by at least first and second respective motors. The vehicle controller also is configured to determine a first vehicle reference speed and a second vehicle reference speed. The first vehicle reference speed is selected from a group of input speeds that includes at least one of the non-satellite-based input speeds and an estimated velocity of the vehicle system that is derived from the satellite-based input speed. The second vehicle reference speed is selected from the one or more non-satellite-based input speeds. The one or more inverter controllers also are configured to concurrently control the speed at which the first axle is rotated by the first motor based on a throttle setting of the vehicle system and the first vehicle reference speed and to control the speed at which at least the second axle of the vehicle system is rotated by the second motor based on the throttle setting and the second vehicle reference speed.

In an embodiment, a method includes deriving a first input speed of a vehicle having at least first and second axles and traveling along a route from position and/or speed data obtained by a global positioning system (GPS) receiver, deriving at least a second input speed of the vehicle from a wheel speed of one or more wheels joined to the second axle of the vehicle as the vehicle travels along the route, and controlling a first speed at which the first axle of the vehicle is rotated to propel the vehicle using a first vehicle reference speed. The terms "first" and "second" may refer to any axles or wheels of the vehicle, and do not necessarily refer to the first and second axles or wheels along a direction of travel. Optionally, the first and second axles or wheels may refer to the first and second axles or wheels along a direction of travel. Additionally, the term "position data" may refer to data that represents a geographic location (e.g., coordinates), a location along a route (e.g., milepost), a speed, or other information representative of where an object such as the vehicle is located and/or moving. The first vehicle reference speed is selected from a first group of input speeds that includes the first input speed and the at least a second input speed. The method may include controlling a second speed at which the second axle of the vehicle is concurrently rotated to propel the vehicle using a second vehicle reference speed. The second vehicle reference speed is obtained from a second group of input speeds that excludes the first input speed.

BRIEF DESCRIPTION OF THE DRAWINGS

Reference is now made briefly to the accompanying drawings, in which.

DETAILED DESCRIPTION

Figure 1:
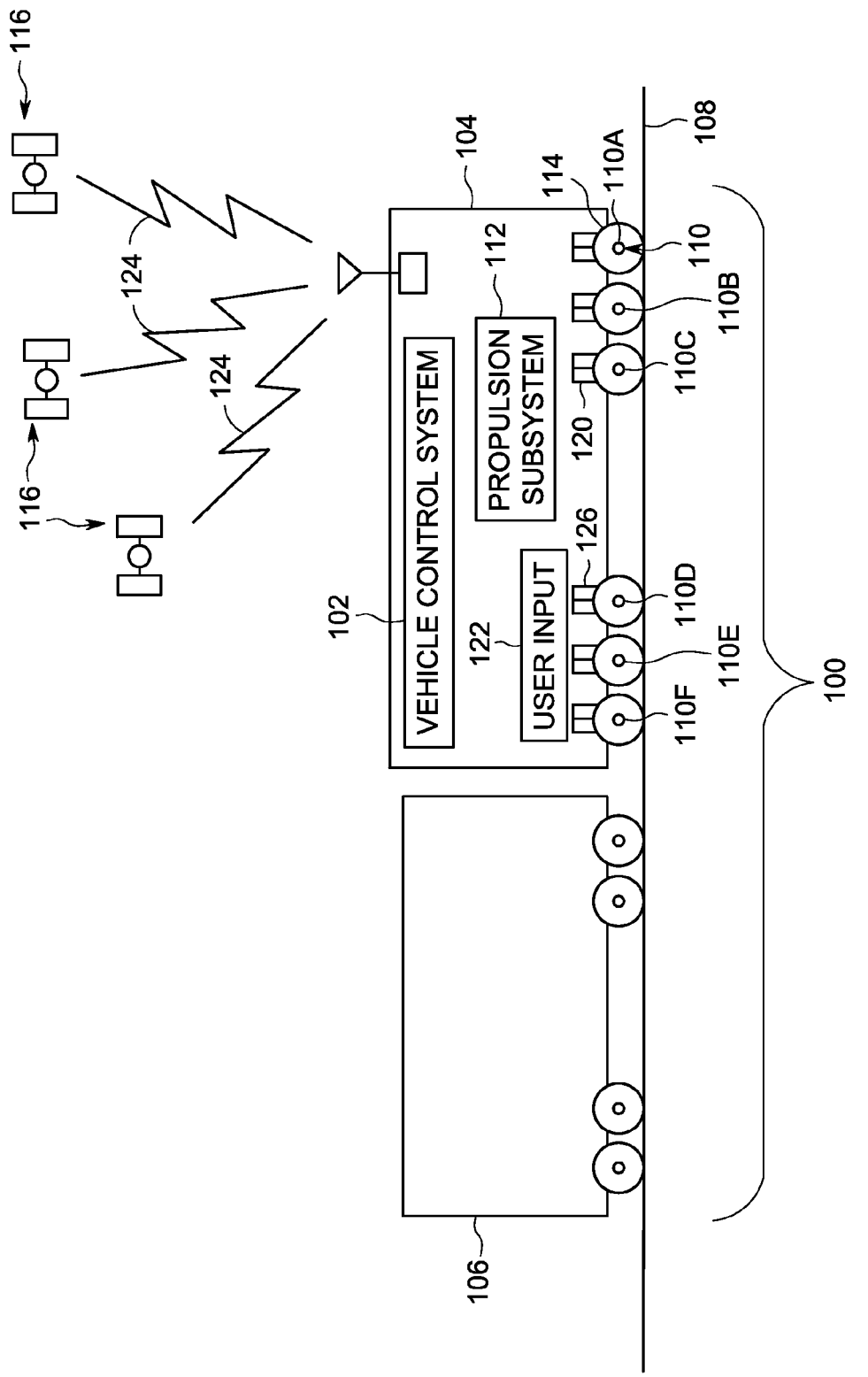
FIG. 1 is a schematic diagram of a vehicle system having an embodiment of a vehicle control system.

In accordance with one or more embodiments described herein, systems and methods provide for the control of the torque applied to powered axles of a vehicle system. The term "powered axles" refers to axles of a vehicle that generates propulsive force or tractive effort to propel the vehicle by rotating the axles using motors interconnected with the axles. For example, powered axles of a locomotive or other rail vehicle may be rotated by traction motors connected with the axles. The torque that is applied by a motor to the axle, and the speeds at which motors rotate axles to propel the vehicle system may be determined from a selected throttle setting of the vehicle system and a vehicle reference speed. The vehicle reference speed used for the different axles may differ.

The vehicle reference speeds for the various axles may differ in that the vehicle reference speed used for at least a first axle may be based on an off-board-based input speed that may be obtained from data signals received from one or more off-board locations disposed off-board of the vehicle system. Suitable off-board may include satellites (e.g., global positioning system (GPS) satellites), wayside devices, wifi communications, radio communications, TV communications, cellular communications/towers, and the like. The vehicle reference speeds used for one or more other axles (or all other axles) in the same vehicle may be at least partially based on onboard-based input speeds that may be not obtained or based on data signals received from any off-board location and/or may be obtained or created onboard the vehicle system. For example, the onboard-based input speeds may be wheel speeds that may be measured by onboard devices such as sensors disposed on the vehicle system for one or more wheels connected to these axles. These onboard-based input speeds may be obtained from speed sensors, such as tachometers. The vehicle reference speeds used for these other axles can be determined from a combination of the off-board-based input speeds and the onboard-based input speeds.

By controlling the speed at which one or more axles may be rotated by using an off-board-based input speed, the vehicle system may be operated more efficiently. The off-board-based speeds may be more accurate than the onboard-based speeds. For example, the onboard-based speeds may be inaccurate due to poor adhesion between the wheels and the route being traveled by the vehicle system. Slippage of the wheels on the route may cause the onboard-based speeds to be faster than the actual speed of the vehicle system. As a result, the motors may rotate the axles at speeds that may be faster than needed to apply the torque associated with a selected throttle setting. Rotating the axles at speeds that may be faster than necessary can result in increased wheel slippage (and, as a result, increased wear and tear on the wheels), reduced tractive effort being applied to the route, reduced fuel efficiency, increased emission generation, and the like.

The off-board-based speeds, on the other hand, may represent the actual speed of the vehicle more accurately than the onboard-based speeds. As a result, rotating the axles at speeds that may be at least partially based on off-board-based input speeds may result in reduced wheel slippage, increased tractive effort being applied to the route, increased fuel efficiency, reduced emission generation, and the like, relative to relying solely on onboard-based input speeds.

FIG. 1 is a schematic diagram of a vehicle system 100 having an embodiment of a vehicle control system 102. The vehicle system may be shown as a rail vehicle consist comprising a propulsion-generating vehicle 104 and a non-propulsion generating vehicle 106. The vehicle system may represent a system of vehicles other than rail vehicles, such as other off highway vehicles (e.g., vehicles that may be not permitted or designed for travel on public roadways), mining equipment, automobiles, marine vessels, and the like. The propulsion-generating vehicle may represent a locomotive, but also may represent another type of vehicle that generates tractive effort to propel the vehicle system. The non-propulsion generating vehicle 106 may represent cargo cars, passenger cars, or the like (or another type of vehicle that does not generate tractive effort). The vehicle system includes the vehicles 104, 106 connected with each other so that the vehicle system can travel along a route 108 (e.g., a track, road, waterway, or the like).

The propulsion-generating vehicle includes two or more axles 110 (e.g., axles 110A-F) that may be rotated by a propulsion subsystem 112 of the vehicle to generate tractive effort and propel the vehicle along the route. The number and arrangement of the axles 110 may be shown only as an example and may be not intended as limitations on all embodiments described herein. For example, although the axle 110A may be shown as the front axle along a direction of travel of the vehicle system, alternatively, the axle 110A may be in another position relative to the other axles 110B-F. As described below, one embodiment of the propulsion subsystem 112 includes traction motors 126 that may be connected to and rotate the axles and inverters that supply electric energy to the traction motors to power the motors. Wheels may connect to the axles and may be rotated by the axles to propel the vehicle along the route.

The vehicle control system, through the propulsion subsystem, may control the torque applied to the axles and the speeds at which the axles may be rotated. In one aspect, the torque applied to the axles and/or the speeds at which the axles may be rotated by the propulsion subsystem 112 may be individually controlled on an axle-by-axle basis. For example, the torque and/or speed of a first axle 110A may be different than the torque and/or speed of a second axle 110B during the same time period, which may differ from the torque and/or speed of a third axle 110C during the same time period, and so on.

The vehicle control system determines vehicle reference speeds that may be used to control the torques applied to the axles and the speeds at which the axles may be rotated by the propulsion subsystem. The vehicle control system receives a selected throttle setting from a user input 122. The selected throttle setting may represent a desired power output or tractive effort that may be to be provided by the vehicle system to travel along the route. The user input may represent a device that may be manually actuated to select the throttle setting, such as a lever, switch, pedal, button, touchscreen, or the like. Additionally or alternatively, the user input may represent a system that automatically designates the selected throttle setting. For example, the user input can include or represent an energy management system that designates throttle settings and/or speeds (from which throttle settings can be automatically determined) of the vehicle system as a function of time and/or distance along the route for a trip. These designated settings and/or speeds may be determined such that operating the vehicle system using the settings and/or speeds results in the vehicle system consuming less fuel and/or producing fewer emissions during a trip over the route than the vehicle system traveling over the same route during the same trip (and arriving at a destination at the same time or within a designated time period) but by traveling according to different settings and/or speeds.

The vehicle control system can determine torques that may be to be applied to the axles and the speeds at which the axles may be to be rotated by the propulsion subsystem to achieve the power output or tractive effort associated with the selected throttle setting. The torques may be determined based on the selected throttle setting (e.g., with greater torques associated with larger throttle settings and lesser torques associated with smaller throttle settings). The speeds at which the axles may be rotated may be determined from the vehicle reference speeds. For example, the vehicle control system may direct the propulsion subsystem to rotate the axles at speeds that may be based on (e.g., related to via one or more mathematical relationships) one or more vehicle reference speeds to apply the torque associated with the selected throttle setting. In one aspect, the vehicle reference speed determination may be performed down to zero vehicle speed. In such an instance, there would be no minimum speed threshold value on the determination function.

In one aspect, the vehicle control system can direct the propulsion subsystem to rotate an axle at a speed that may be within a designated range of speeds relative to a vehicle reference speed. Although this designated range of speeds may be modified and/or customized depending on a desired outcome, the designated range of speeds may include from about 103% to about 104% of a vehicle reference speed. Alternatively, the designated range of speeds may be a larger range of percentages or fractions of the vehicle reference speed. In another embodiment, the designated range of speeds may include the vehicle reference speed.

The vehicle reference speed that may be used to control the speeds at which the axles may be rotated may differ for different axles of the same vehicle. For example, for at least one axle 110A (or another axle 110B-F), the vehicle reference speed may be based on an off-board-based input speed. For one or more other axles (or all other axles), the vehicle reference speed may be based on an onboard-based input speed, such as one or more measured wheel speeds and/or a combination of these wheel speeds and the off-board-based input speed.

The vehicle control system can obtain the off-board-based input speed from data signals received from one or more off-board devices 116. These off-board devices 116 can represent or include satellites, wayside devices, cellular towers and/or antennas, wireless network antennas, and the like. A position and/or velocity data receiver 118 (such as GPS satellites, wayside devices, wifi communications, radio communications, TV communications, cellular communications/towers, and the like) may receive position and/or velocity data signals 124 from one or more of the off-board devices 116. The position and/or velocity data signals may be used by the vehicle control system 102 and/or the position and/or velocity data receiver 118 to calculate the off-board-based input speed. The off-board-based input speed can represent the actual speed of the vehicle system and/or the vehicle as the vehicle system actually travels along the route. As one example, the off-board devices can represent satellites. Additionally or alternatively, the off-board-based input speed may be obtained from one or more other devices disposed remote from the vehicle system other than the satellites. For example, stationary wayside devices disposed alongside the route may communicate position and/or velocity data with the vehicle control system as the vehicle control system travels along the route. This position and/or velocity data may represent the position of the devices and/or other information that can be used to calculate the speed of the vehicle system. The vehicle control system can determine the locations of multiple wayside devices as the vehicle system passes the wayside devices or otherwise moves relative to the wayside devices and determine the vehicle reference speed based on the locations of the wayside devices and the movement of the vehicle system relative to the wayside devices. Additionally or alternatively, the vehicle control system may receive the satellite-based input speed from another remote location, such as a dispatch facility or center.

Optionally, the off-board-based input speeds may be obtained or derived from at least some data generated or obtained onboard the vehicle system. For example, the position and/or velocity data receiver 118 may include or represent one or more gyroscopes and/or accelerometers that generate data representative of movement of the vehicle system. The position and/or velocity data receiver and/or control system may include a clock, such as an atomic clock, or be in communication with such a clock, to track passage of time relative to a reference time (e.g., the atomic clock). Using the data on the movement of the vehicle system from a known location (e.g., a starting location) and the passage of time from the reference time, the control system may determine current speeds of the vehicle system and use these speeds as off-board-based input speeds.

The vehicle control system can obtain the onboard-based input speeds from one or more sensors that do not receive signals from remote locations (e.g., the off-board devices) to measure the speed of the vehicle system. For example, the vehicle control system may receive measured wheel speeds of the wheels of the vehicle system as the vehicle system travels along the route. The wheel speeds may be measured by speed sensors 120, such as tachometers or other devices that measure the speeds at which the wheels and/or axles rotate. Additionally or alternatively, the onboard-based input speeds may be obtained from another type of sensor that may be disposed onboard the vehicle system and that measures movement of one or more components of the vehicle system to determine the onboard-based input speeds.

For at least one axle 110A (or one or more of axles), the vehicle control system determines the vehicle reference speed that may be used to control the speed at which the axle 110A may be rotated from a group of input speeds that includes the off-board-based input speed. For example, the vehicle reference speed that may be used to determine the speed at which the axle 110A may be rotated may be selected or calculated from a group of input speeds that includes the off-board-based input speed and the onboard-based input speeds associated with one or more other axles. As described in more detail below, such a vehicle reference speed may be selected as the input speed in the group that may be faster than one or more other input speeds in the group, or as the fastest input speed in the group, when the vehicle may be braking (e.g., generating braking effort to slow or stop movement of the vehicle and/or vehicle system). The vehicle reference speed for the axle 110A may be selected as the input speed in the group that may be slower than one or more other input speeds in the group, or as the slowest input speed in the group, when the vehicle may be motoring (e.g., generating tractive effort to propel the vehicle and/or vehicle system). A faster input speed may be used as the vehicle reference speed when the vehicle may be braking so that the vehicle reference speed may be less likely to be based on wheel slip, since slower rotating wheels (e.g., onboard-based input speed) during braking may be more likely to be the result of the wheels slipping relative to the route during braking than faster moving wheels. A slower input speed may be used as the vehicle reference speed when the vehicle may be motoring so that the vehicle reference speed may be less likely to be based on wheel slip, since faster rotating wheels (e.g., onboard-based input speed) during motoring may be more likely to be the result of the wheels slipping relative to the route 108 during motoring than slower moving wheels.

For one or more other axles, the vehicle control system can determine the vehicle reference speed that may be used to control the speeds at which the other axles may be rotated from a group of onboard-based input speeds. For example, the vehicle reference speed for the axles may be selected as the median or average of the onboard-based input speeds in this group of input speeds. Alternatively, another calculation or technique may be used to select the vehicle reference speed from this group of onboard-based input speeds.

The vehicle reference speeds may be used by the vehicle control system to determine the speeds at which the axles may be rotated by motors of the propulsion subsystem. For example, to generate the torque associated with a selected throttle setting, the propulsion subsystem may be directed by the vehicle control system to rotate the axles at speeds that may be within the designated range of speeds relative to the vehicle reference speed. As one example, the designated range of speeds for an axle can include a range of speeds of a vehicle reference speed, such as x to y percent of the vehicle reference speed associated with the axle 110. As described above, x can represent 103% and y can represent 104%, although other amounts may be used for x or y. Therefore, for the axle 110A associated with the satellite-based input speed, the propulsion subsystem 112 may be directed to rotate the axle 110A at a speed that may be within x to y percent of the satellite-based input speed. For the axles, the propulsion subsystem 112 may be directed to rotate the axles at speeds that may be within x to y percent of the vehicle reference speed selected from the group of reference speeds, as described above.

Figure 2:
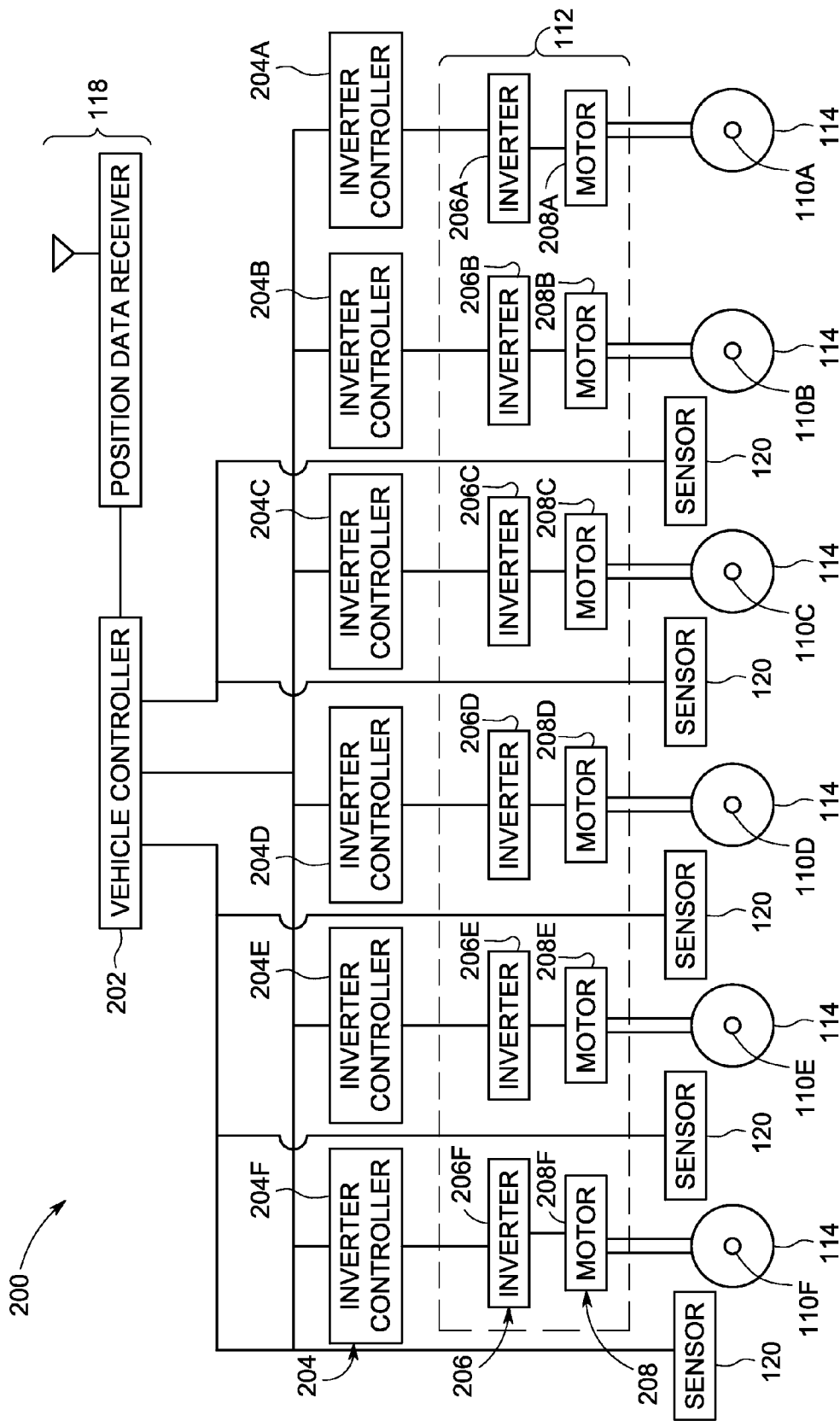
FIG. 2 is a schematic diagram of an embodiment of a vehicle control system.

FIG. 2 is a schematic diagram of an embodiment of a vehicle control system 200. The vehicle control system 200 may represent the vehicle control system shown in FIG. 1. The vehicle control system 200 includes a vehicle controller 202 that may include or represent hardware circuitry or circuits that include and/or are connected to one or more processors, microcontrollers, or other logic-based devices. The vehicle controller 202 obtains the input speeds and determines the vehicle reference speeds described above. For example, the vehicle controller 202 may communicate with the position and/or velocity data receiver 118 to receive the position and/or velocity data transmitted by the off-board devices 116 (shown in FIG. 1). From the data received by the position and/or velocity data receiver 118, the vehicle controller 202 can calculate the off-board-based input speed of the vehicle (shown in FIG. 1).

The vehicle control system 200 includes the speed sensors 120 that may be operatively connected with the wheels 114 and/or axles of the vehicle. The speed sensors 120 can include or represent tachometers that may be disposed relatively close to the wheels 114 and/or axles, or that may be mechanically connected with the wheels 114 and/or axles, so that the speed sensors 120 can measure the speed at which the wheels 114 and/or axles rotate during movement of the vehicle.

Several inverter controllers 204 (e.g., inverter controllers 204A-F) of the vehicle control system 200 determine the speeds at which to rotate the respective axles. The inverter controllers 204 can include or represent one or more processors, microcontrollers, or other logic-based devices. The inverter controllers 204 can be communicatively coupled with a propulsion subsystem 210 to control the speeds at which the axles may be rotated. The propulsion subsystem 210 is similar to the propulsion subsystem shown in FIG. 1. The inverter controllers 204 may connect with inverters 206 of the propulsion subsystem 210. The inverters 206 control the supply of electric current to motors 208 (e.g., motors 208A-F) of the propulsion subsystem 210. The motors 208 may be operatively connected with the axles, such as by being directly coupled with the axles or interconnected with the axles by one or more gears, pinions, and the like. The inverters 206 control the speed at which the motors 208 rotate the axles by controlling the electric current supplied to the motors 208, such as by controlling a frequency of alternating current that may be supplied to the motors 208.

The inverter controllers 204 receive the torques that may be to be applied to the axles by the inverters 206 and the vehicle reference speed(s) from the vehicle controller 202. As described above, the vehicle controller 202 can identify a first vehicle reference speed for the axle 110A (or another axle 110) from a group of input speeds that includes the off-board-based input speed and one or more of the onboard-based input speeds. The vehicle controller 202 can identify a second vehicle reference speed (which may differ from the first vehicle reference speed or be the same as the first vehicle reference speed) for the axles from a group of input speeds that includes the onboard-based input speeds, but that may not include the off-board-based input speed.

The inverter controllers 204 determine the speeds at which to rotate the axles based on the received vehicle reference speeds for the respective axles. For example, the inverter controllers 204 can direct the inverters 206 to supply current to the motors 208 that causes the motors 208 to rotate the axles at speeds that may be within a designated range of the vehicle reference speed for the respective axle 110. The inverter controller 204A can direct the inverter 206A to supply the motor 208A with current that causes the motor 208A to rotate the axle 110A at a speed that may be within a designated range (e.g., 103 to 104%) of the vehicle reference speed for the axle 110A, and the inverter controllers 204B-F can direct the respective inverters 206B-F to supply current to the respective motors 208B-F that causes the motors 208B-F to rotate the respective axles at speeds that may be within the designated range of the vehicle reference speed associated with the axles.

Figure 3:
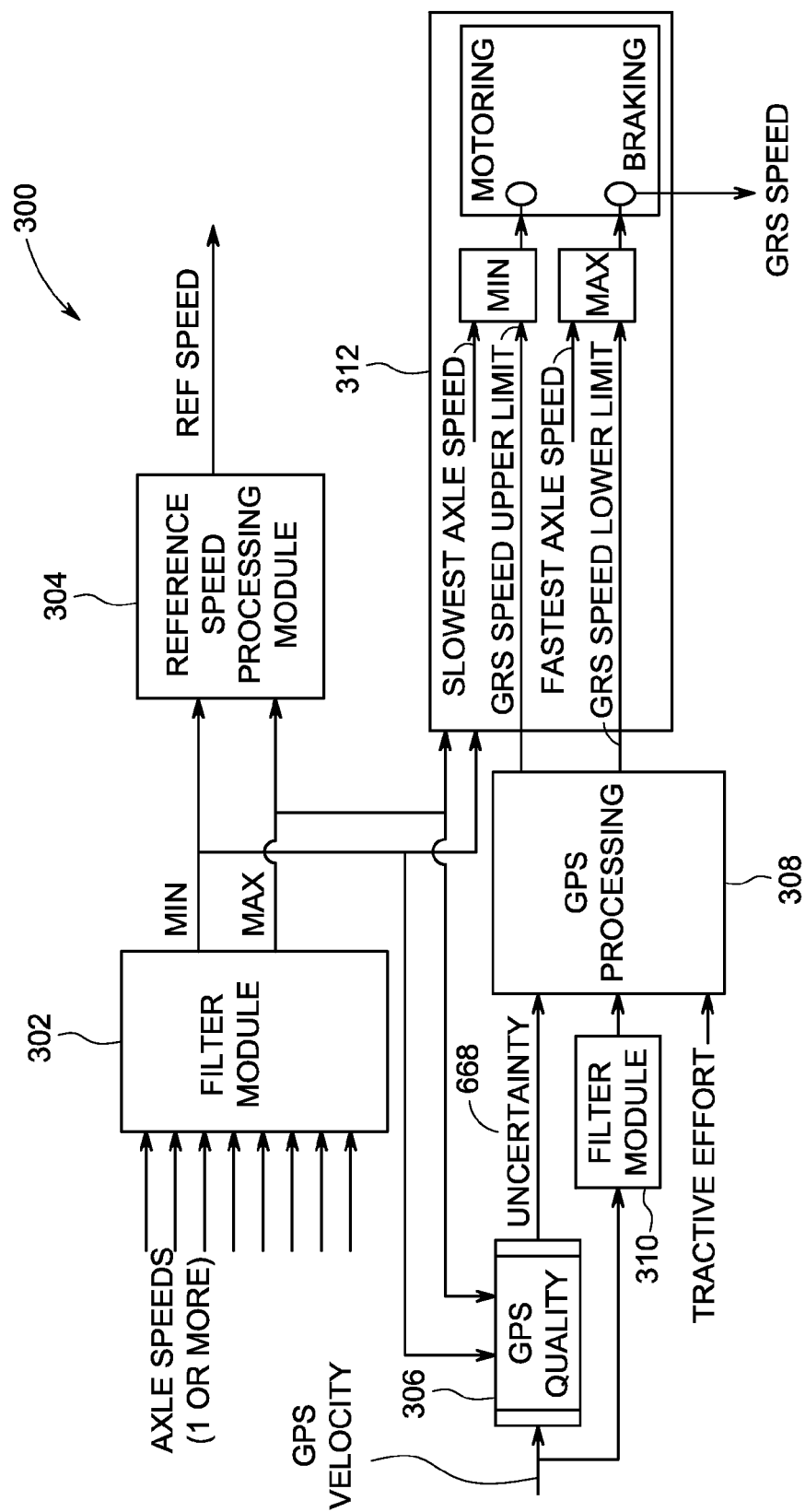
FIG. 3 illustrates an embodiment of a vehicle controller.

FIG. 3 illustrates an embodiment of a vehicle controller 300. The vehicle controller 300 may represent the vehicle controller 202 shown in FIG. 2. The vehicle controller 300 includes several modules that represent hardware and/or software used to perform the functions of the vehicle controller 300 described herein. The modules may represent one or more circuits or circuitry that includes and/or may be connected to one or more processors, controllers, microcontrollers, circuitry, and/or other hardware, and/or associated software that directs the processors, controllers, microcontrollers, circuitry, and/or other hardware to perform the functions and operations described herein. Additionally or alternatively, the modules may represent one or more tangible and non-transitory computer readable media that stores one or more sets of instructions for directing the operations of one or more processors, controllers, or other logic-based devices.

A filter module 302 receives input speeds ("Axle Speeds" in FIG. 3) associated with the axles (shown in FIG. 1). For example, the filter module 302 can receive the onboard-based input speed associated with the axles. The filter module 302 examines these input speeds and identifies a slow input speed ("Min" in FIG. 3) and/or a fast input speed ("Max") from this group of input speeds. The slow reference speed may be slower than one or more other onboard-based input speeds, or that may be the slowest input speed of the onboard-based input speeds received by the filter module 302. The fast input speed may be faster than one or more other onboard-based input speeds, or that may be the fastest input speed of the input speeds received by the filter module 302.

In the illustrated embodiment, the filter module 302 communicates the fast and slow onboard-based input speeds to a reference speed processing module 304. The reference speed processing module 304 selects one or more of these input speeds communicated from the filter module 302 for sending to the inverter controllers 204 (shown in FIG. 2) associated with the axles. For example, the reference speed processing module 304 may select the fastest onboard-based input speed, the slowest onboard-based input speed, the average onboard-based input speed, the median onboard-based input speed, or another onboard-based input speed as a vehicle reference speed for the axles. The reference speed processing module 304 can communicate this onboard-based vehicle reference speed ("Ref Speed" in FIG. 3) that may be selected from those onboard-based input speeds communicated from the filter module 302 to the inverter controllers 204B-F that control the speeds at which the motors 208 rotate the axles that may be not associated with the off-board-based input speed (e.g., the axles or another set of axles).

To account for potential inaccuracies in the off-board-based input speed, the vehicle control system may determine an uncertainty parameter of the off-board-based input speed. The uncertainty parameter may be indicative of inaccuracy or potential inaccuracy of the actual speed of the vehicle system as represented by the off-board-based input speed. Larger uncertainty parameters can indicate that a difference between the off-board-based input speed and the actual speed of the vehicle may be larger than for smaller uncertainty parameters. An off-board-based input speed quality module 306 ("GPS Quality" in FIG. 3) can determine this uncertainty parameter. In one aspect, the quality module 306 uses both the off-board-based input speed ("GPS Velocity" in FIG. 3), or data signals from the position and/or velocity data receiver 118 (shown in FIG. 1), and vehicle-based information to determine the uncertainty parameter.

Figure 5:
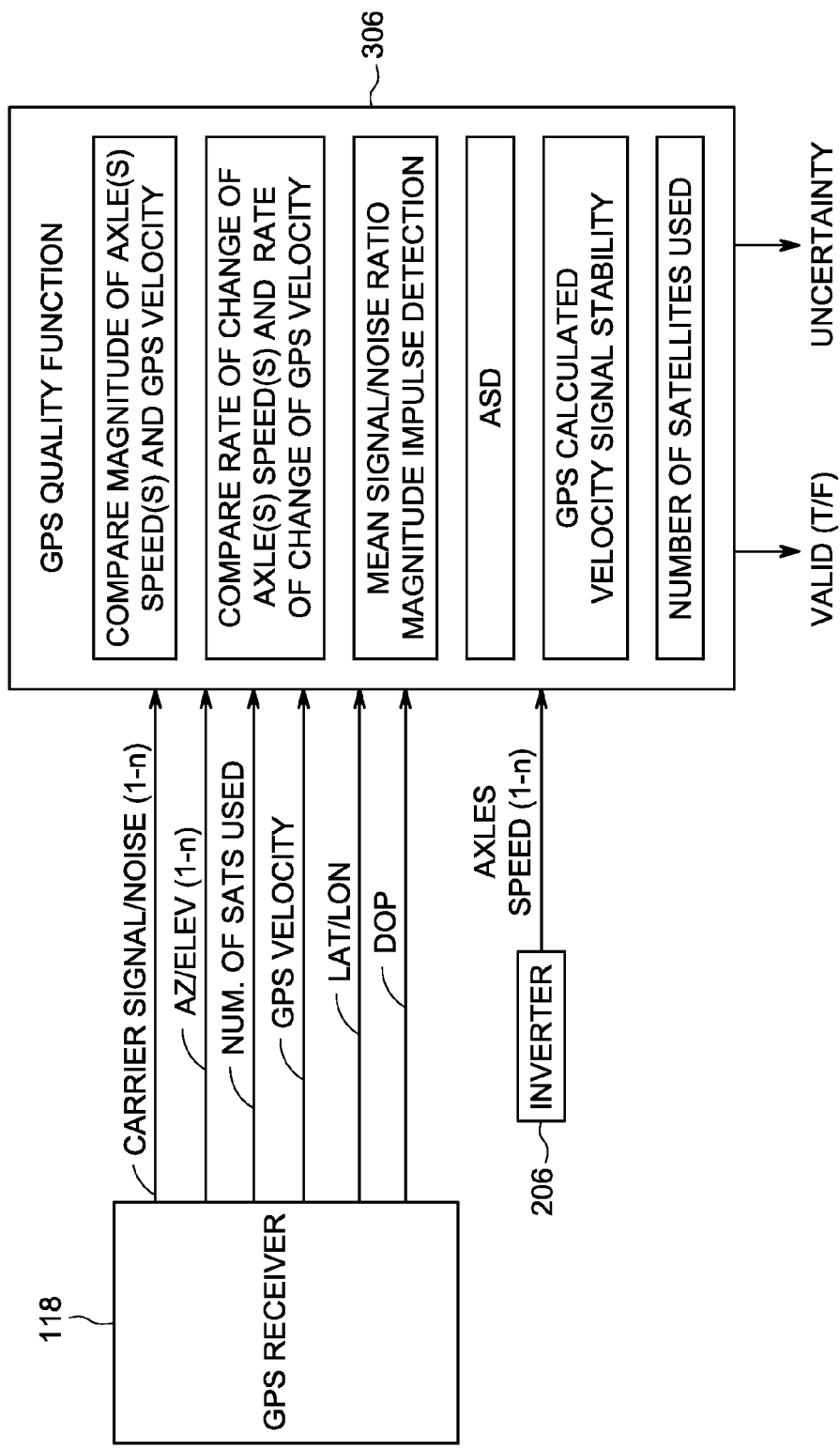
FIG. 5 illustrates a schematic diagram of one example of a quality module shown in FIG. 3.

FIG. 5 illustrates a schematic diagram of one example of the quality module 306 shown in FIG. 3. The quality module 306 receives input data from the position and/or velocity data receiver 118 ("GPS Receiver" in FIG. 3, although the position and/or velocity data receiver 118 may represent a device other than a GPS receiver) and from one or more of the inverters 206 of the vehicle 200 (shown in FIG. 2). The input data that may be provided by and/or received from the position and/or velocity data receiver 118 includes a carrier signal to noise ratio ("Carrier signal/noise (1-n)" in FIG. 5), one or more position measurements of the vehicle system (e.g., an azimuth measurement, an elevation measurement, a latitude measurement, a longitude measurement, or the like; shown as "Az/Elev (1-n)" and "Lat/Lon" in FIG. 5), a number of off-board devices 116 from which input data signals may be received by the position and/or velocity data receiver 118

("Num. of Sats Used" in FIG. 5), a dilution of precision or geometric dilution of precision measurement ("DOP" in FIG. 5), and the like. Optionally, the input data provided by and/or received from the position and/or velocity data receiver 118 may include less than this information, additional information, or different information. The input data that may be provided by and/or received from one or more of the inverters 206 includes speeds at which the axles may be rotated (shown as "Axle Speed (1-n)" in FIG. 5). Optionally, this input data may be provided by and/or received from one or more of the inverter controllers 204.

The quality module 306 can apply a quality function (shown as "GPS Quality function" in FIG. 5) using some or all of the input data described above to determine an uncertainty parameter (shown as "Uncertainty" in FIG. 5). In an embodiment, the quality function involves comparing the input data to a cascade of different thresholds to derive the uncertainty parameter and/or position and/or velocity data representative of the location of the position and/or velocity data receiver 118 (e.g., GPS or other coordinates, represented as "Valid (T/F)" in FIG. 5). The uncertainty parameter and/or position and/or velocity data may be output by the quality module 306, such as by communicating this information to the vehicle controller 202 (shown in FIG. 2).

Figure 6:
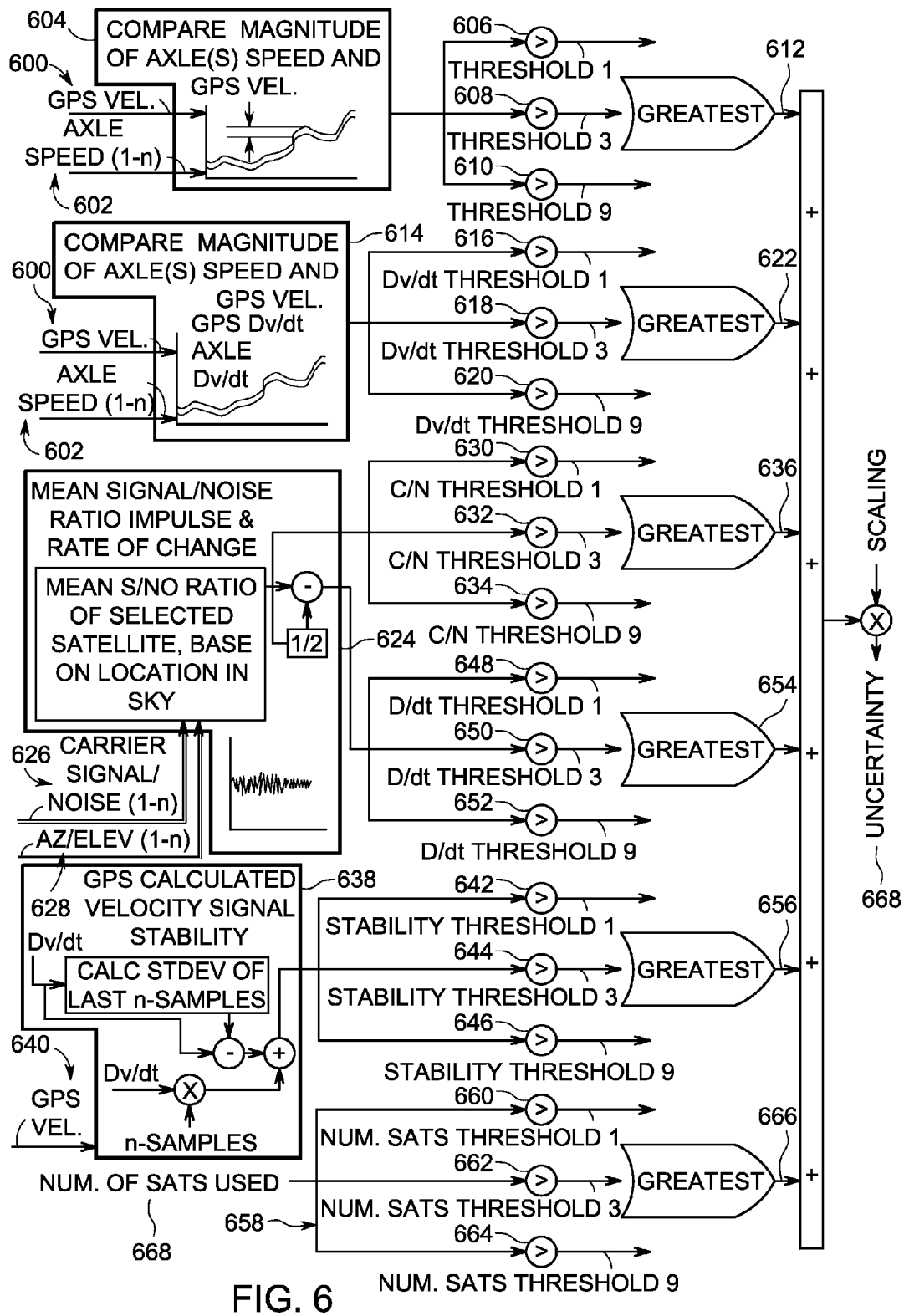
FIG. 6 illustrates a schematic diagram of one example of application of a quality function used by the quality module to determine the uncertainty parameter.

With continued reference to the quality module 306 illustrated in FIG. 5, FIG. 6 illustrates a schematic diagram of one example of application of the quality function used by the quality module 306 to determine the uncertainty parameter. The quality module 306 can examine a number of factors in determining the uncertainty parameter of location data. In an embodiment, one or more of these factors may be based on data or information provided by a source other than the position and/or velocity data receiver 118. For example, input speeds representative of speeds at which the axles (shown in FIG. 1) may be used. The factors used by the quality module 306 to determine the uncertainty parameter can include, but may be not limited to or require the use of all of, a comparison of the magnitude of measured axle speeds ("Axle(s) Speed(s)" in FIG. 5; also referred to as onboard-based input speeds) with a velocity based on position and/or velocity data received by the position and/or velocity data receiver 118 ("GPS Vel" in FIG. 5; also referred to as an off-board-based input speed), a comparison of a rate of change in the onboard-based input speeds with a rate of change in the off-board-based input speeds, a mean or average signal-to-noise ratio of the carrier signal received by the position and/or velocity data receiver 118, a magnitude of the carrier signal received by the position and/or velocity data receiver 118, the existence or detection of any signals or other factors that may negatively impact the signals received by the position and/or velocity data receiver 118 (e.g., solar flares, wireless interference, buildings, trees, cloud coverage, and the like; shown as "Impulse Detection" in FIG. 5), a stability or variance in the off-board-based input speed (e.g., a deviation, variance, or other statistical analysis of how much the off-board-based input speed changes or varies with respect to time due to variances or instability in the input data; shown as "GPS Calculated Velocity Signal Stability" in FIG. 5), a number of off-board devices 116 (shown in FIG. 1) from which signals used to determine the position and/or velocity data may be received, and the like. Additional or other factors may be used.

Application of the quality function to these factors involves comparing some of the factors with each other, comparing the factors (and/or a comparison of the factors) to one or more thresholds, and/or summing the results of these comparisons to derive the uncertainty signal. In an embodiment, a first comparison 604 that may be performed by the quality module 306 to determine the uncertainty parameter involves comparing an off-board-based input speed 600 and one or more onboard-based input speeds 602. The quality module 306 compares these input speeds 600, 602 to determine a difference between the input speeds 600, 602. This difference may be compared to one or more thresholds. In the illustrated example, the difference in input speeds 600, 602 may be compared to a plurality of thresholds. In the illustrated embodiment, there are three thresholds 606, 608, 610. The third threshold 610 may be larger than the second threshold 608, and the second threshold 608 may be larger than the first threshold 606. If the difference between the input speeds 600, 602 exceeds one or more of these thresholds 606, 608, 610, then a weighted influence 612 may be determined. This weighted influence 612 can be combined with one or more other weighted influences (described below) to calculate the uncertainty parameter that may be output by the quality module 306. Different weighted influences may be determined based on which of the thresholds 606, 608, 610 may be exceeded by the difference in the input speeds 600, 602. In the illustrated example, if the first threshold 606 may be exceeded by the difference between the input speeds 600, 602 and the second and third thresholds 608, 610 may be not exceeded by this difference, then the weighted influence 612 that may be determined may be assigned a smaller value (e.g., one or another value) than if this difference exceeded the second and/or third threshold 608, 610. If the first and second thresholds 606, 608 may be exceeded by the difference between the input speeds 600, 602 but the third threshold 610 may be not exceeded by this difference, then the weighted influence 612 that may be determined may be assigned a larger value (e.g., three or another value) than if this difference exceeded the third threshold 610. If the first, second, and third thresholds 606, 608, 610 may be exceeded by the difference between the input speeds 600, 602, then the weighted influence 612 that may be determined may be assigned a larger value (e.g., nine or another value). In one aspect, the weighted influence 612 may have a smaller, smallest, or no value (e.g., value of zero) if the difference in the input speeds 600, 602 does not exceed any of the thresholds 606, 608, 610.

A second comparison 614 that may be performed by the quality module 306 to determine the uncertainty parameter involves another comparison of the off-board-based input speed 600 and one or more onboard-based input speeds 602. The quality module 306 compares these input speeds 600, 602 to determine a difference in the rate of changes in the input speeds 600, 602. For example, the quality module 306 may determine a first rate of change in the off-board-based input speed 600 (shown as "GPS Dv/dt" in FIG. 6) and determine a second rate of change in the onboard-based input speed 602 (shown as "Axle Dv/dt" in FIG. 6). The quality module 306 may compare these rates of change with each other to determine a difference between the rates of change. This difference may be compared to one or more thresholds. In the illustrated example, the difference in the rates of change in the input speeds 600, 602 may be compared to three thresholds 616, 618, 620. Optionally, a different number of thresholds may be used. The third threshold 620 may be larger than the second threshold 618, and the second threshold 618 may be larger than the first threshold 616. If the difference between the rates of change in the input speeds 600, 602 exceeds one or more of these thresholds 616, 618, 620, then a weighted influence 622 may be determined. As described above, this weighted influence 622 can be combined with one or more other weighted influences to calculate the uncertainty parameter that may be output by the quality module 306. Similar to as described above, different weighted influences may be determined based on which of the thresholds 616, 618, 620 may be exceeded by the difference in the rates of change in the input speeds 600, 602. In the illustrated example (and similar to as described above), if the first threshold 616 may be exceeded, then the weighted influence 622 that may be determined may be assigned a smaller value (e.g., one or another value). If the first and second thresholds 616, 618 may be exceeded, then the weighted influence 622 that may be determined may be assigned a larger value (e.g., three or another value). If the first, second, and third thresholds 616, 618, 620 may be exceeded, then the weighted influence 622 that may be determined may be assigned a larger value (e.g., nine or another value). In one aspect, the weighted influence 622 may have a smaller, smallest, or no value (e.g., value of zero) if the difference does not exceed any of the thresholds 616, 618, 620.

A third comparison 624 that may be performed by the quality module 306 to determine the uncertainty parameter involves a comparison of a carrier signal-to-noise ratio 626, an azimuth measurement, and an elevation measurement (collectively referred to by 628 in FIG. 6). C/N represents Carrier Signal/Noise ratio (similar to stated previously). And the Magnitude of C/N may be compared to thresholds. D/dt may be the C/N d/dt, or the change in C/N over time (Impulse). The C/N d/dt may be then compared to thresholds. The quality module 306 may compare the C/N to one or more thresholds and the d/dt to one or more thresholds. In the illustrated example, the C/N may be compared to three thresholds 630, 632, 634 and the d/dt may be compared to three thresholds 648, 650, 652. Optionally, a different number of thresholds may be used.

With respect to the thresholds 630, 632, 634, the third threshold 634 may be larger than the second threshold 632, and the second threshold 632 may be larger than the first threshold 630. If the C/N exceeds one or more of these thresholds 630, 632, 634, then a weighted influence 636 may be determined. As described above, this weighted influence 636 can be combined with one or more other weighted influences to calculate the uncertainty parameter that may be output by the quality module 306. Similar to as described above, different weighted influences may be determined based on which of the thresholds 630, 632, 634 may be exceeded by the C/N, such as values of one, three, and nine. Alternatively, one or more other values may be used. In one aspect, the weighted influence 636 may have a smaller, smallest, or no value (e.g., value of zero) if the C/N does not exceed any of the thresholds 630, 632, 634.

With respect to the thresholds 648, 650, 652, the third threshold 652 may be larger than the second threshold 650, and the second threshold 650 may be larger than the first threshold 648. If the d/dt exceeds one or more of these thresholds 648, 650, 652, then a weighted influence 654 may be determined. As described above, this weighted influence 654 can be combined with one or more other weighted influences to calculate the uncertainty parameter that may be output by the quality module 306. Similar to as described above, different weighted influences may be determined based on which of the thresholds 648, 650, 652 may be exceeded by the d/dt, such as values of one, three, and nine, respectively. Alternatively, one or more other values may be used. In one aspect, the weighted influence 654 may have a smaller, smallest, or no value (e.g., value of zero) if the d/dt does not exceed any of the thresholds 648, 650, 652.

A fourth comparison 638 that may be performed by the quality module 306 to determine the uncertainty parameter involves an examination and comparison of the stability or variance 640 in the off-board-based input speed (e.g., a deviation, variance, or other statistical analysis of how much the off-board-based input speed changes or varies with respect to time due to variances or instability in the input data) with one or more thresholds 642, 644, 646. A stability quantity can be calculated to represent this deviation, variance, or other statistical analysis. For example, for a vehicle, a potential or calculated acceleration of the vehicle can be calculated from a mass of the vehicle and potential or directed propulsion forces generated by the vehicle. This potential or calculated acceleration can be used to derive a velocity of the vehicle as an expected velocity. The stability quantity can represent how close or far the expected velocity and the off-board-based input speed are with each other. For example, if the expected velocity is much slower or faster than the off-board-based input speed, then the stability may be calculated as being a relatively small number. On the other hand, if the expected velocity is closer to the off-board-based input speed, then the stability may be calculated as a larger number. For a given vehicle, and based on the vehicle mass and potential propulsion forces (e.g., from traction motors or drive shafts), the control system calculates the possible acceleration that could occur at a moment in time. Knowing the possible/potential/expected value of Velocity, if GPS Velocity input changes such that do not follow the expected physics model outcome, then it may be detected that the GPS Velocity signal may be "unstable". Standard Deviation may be just one way to estimate the expected, and then compare it to the change in Velocity (acceleration/deceleration). The quality module 306 may compare this stability to one or more thresholds. In the illustrated example, the stability may be compared to three thresholds 642, 644, 646. Optionally, a different number of thresholds may be used. The third threshold 646 may be larger than the second threshold 644, and the second threshold 644 may be larger than the first threshold 642. If the stability exceeds one or more of these thresholds 642, 644, 646, then a weighted influence 656 may be determined. As described above, this weighted influence 656 can be combined with one or more other weighted influences to calculate the uncertainty parameter that may be output by the quality module 306. Similar to as described above, different weighted influences may be determined based on which of the thresholds 642, 644, 646 may be exceeded by the stability, such as values of one, three, and nine, respectively. Alternatively, one or more other values may be used. In one aspect, the weighted influence 656 may have a smaller, smallest, or no value (e.g., value of zero) if the stability does not exceed any of the thresholds 642, 644, 646.

A fifth comparison 658 that may be performed by the quality module 306 to determine the uncertainty parameter involves a comparison of a number of off-board devices 116 from which data signals were received by the position and/or velocity data receiver 118 (shown as "Num. of Sats Used" in FIG. 6 and referred to as "number 668" in FIG. 6) with one or more thresholds 660, 662, 664. In the illustrated example, this number 668 of off-board devices 116 may be compared to three thresholds 660, 662, 664. Optionally, a different number of thresholds may be used. In contrast to the other sets of thresholds, the third threshold 664 may be smaller than the second threshold 662, and the second threshold 662 may be smaller than the first threshold 660. If the number 668 of off-board devices 116 from which data signals were received may be smaller or larger than one or more of these thresholds 660, 662, 664, then a weighted influence 666 may be determined. For example, if this number 668 may be greater than the first threshold 660, then a smaller value (e.g., a value of one or another value) may be output as the weighted influence

666. If this number 668 may be less than the first threshold 660 but greater than the second threshold 662, then a larger value (e.g., a value of three or another value) may be output as the weighted influence 666. If this number 668 may be less than the second threshold 662 but larger than the third threshold 664, then a larger value (e.g., a value of nine or another value) may be output as the weighted influence 666. In one aspect, if this number 668 may be smaller than the third threshold 664, then the weighted influence 666 may be output with an even larger value.

One or more, or all, of the weighted influences 612, 622, 636, 654, 656 may be used to determine the uncertainty parameter 668 that may be output from the quality module 306. In an embodiment, the weighted influences 612, 622, 636, 654, 656 may be combined (e.g., by summing the influences 612, 622, 636, 654, 656). The combined influences 612, 622, 636, 654, 656 may be scaled, such as by multiplying the combined influences 612, 622, 636, 654, 656 by a number that may be less than or greater than one, to produce the uncertainty parameter 668. The uncertainty parameter 668 that may be produced can represent a range of speeds above and/or below the off-board-based input speed. For example, if the off-board-based input speed may be 60 kilometers per hour and the uncertainty parameter 668 may be 3 kilometers per hour, then the uncertainty parameter 668 can indicate that the actual, true speed of the vehicle system may be between 57 and 63 kilometers per hour.

Returning to the description of the vehicle controller 300 shown in FIG. 3, the uncertainty parameter can be communicated from the quality module 306 to an off-board-based input speed processing module 308, otherwise referred to as a GPS reference speed processing module ("GRS Processing" in FIG. 3). The off-board-based input speed (or data signals received from the satellites 116 to enable the off-board-based input speed to be calculated) also may be communicated to another filter module 310. The filter module 310 may filter out one or more of the off-board-based input speeds, such as by only communicating slower or the slowest off-board-based input speeds that may be received over a given time period. The filter module 310 can communicate the filtered off-board-based input speeds to the processing module 308. The processing module 308 also may receive the tractive effort supplied by the propulsion subsystem 112, 210 (shown in FIGS. 1 and 2) and/or that may be designated by the selected throttle setting received from the user input 122 (shown in FIG. 1). The uncertainty parameter may be in units of velocity, such as kilometers or miles per hour.

The processing module 308 may examine the uncertainty parameter, the filtered off-board-based input speed(s), one or more onboard-based input speeds, and/or the tractive effort and calculate an estimated velocity of the vehicle. The estimated velocity may be first order estimate, or an estimate of a first magnitude of the actual speed of the vehicle. The estimated velocity can be based on recent acceleration of the vehicle and/or vehicle system (as determined from the filtered off-board-based input speeds), inertia of the vehicle system, and/or the tractive effort of the vehicle and/or vehicle system (e.g., where more than one propulsion-generating vehicle may be included in the vehicle system).

In one aspect, the processing module 308 determines if one or more of the speed sensors 120 (shown in FIG. 1) provide onboard-based input speeds that fall within the range of speeds represented by the off-board-based input speed and the uncertainty parameter 668. For example, if the off-board-based input speed and the uncertainty parameter 668 represent a range of speeds of 65 kilometers to 75 kilometers, then the processing module 308 can determine if any of the onboard-based input speeds may be within 65 to 75 kilometers per hour. Any such onboard-based input speeds may be identified and used to influence (e.g., modify) the off-board-based input speed.

As one example, if the off-board-based input speed and the uncertainty parameter 668 represent a range of speeds of 65 kilometers per hour to 75 kilometers per hour, and the off-board-based input speed indicates a speed of 70 kilometers per hour, then the processing module 308 may determine if any onboard-based input speeds may be within 65 kilometers per hour to 75 kilometers per hour. If one or more onboard-based input speeds may be within this range (e.g., 68 kilometers per hour), then the processing module 308 may modify (e.g., reduce) the off-board-based input speed and/or future off-board-based input speeds. The off-board-based input speeds may be modified such that the off-board-based input speeds may be closer or equivalent to the onboard-based input speeds that fall within the range of the uncertainty parameter 668.

The processing module 308 can combine the estimated velocity with the uncertainty parameter to determine an upper limit on the speed of the vehicle (e.g., "GRS Speed Upper Limit" in FIG. 3) and a lower limit on the speed of the vehicle (e.g., "GRS Speed Lower Limit" in FIG. 3). For example, the upper limit may be calculated as a sum of the estimated velocity of the vehicle or vehicle system and the uncertainty parameter. The lower limit may be calculated as a difference between the estimated velocity and the uncertainty parameter, such as the uncertainty parameter subtracted from the estimated velocity.

An output module 312 receives the upper limit and the lower limit from the processing module 308 and receives the slow onboard-based input speed and the fast onboard-based input speed from the filter module 302. For example, the output module 312 can receive the outer limits on the off-board-based input speed (as represented by the upper limit and lower limits on the off-board-based input speed received from the processing module 308) and receive the slower or slowest onboard-based input speed ("Slowest Axle Speed" in FIG. 3) and the faster or fastest onboard-based input speed from the filter module 302 ("Fastest Axle Speed" in FIG. 3).

The output module 312 can monitor the tractive and/or braking efforts provided by the propulsion subsystem 112, 210 to determine if the vehicle may be motoring or braking and to select the vehicle reference speed for the axle 110A based on this determination. If the vehicle may be motoring, the output module 312 identifies a smaller speed or the smallest speed of the speeds in a group that includes the slow speed of the onboard-based input speeds received from the filter module 302 (e.g., the Slowest Axle Speed) and the upper limit on the off-board-based input speed received from the processing module 308 (e.g., the GRS Speed Upper Limit). The speed that may be identified ("GRS Speed" in FIG. 3) can be used as a vehicle reference speed for the axle 110A to control the speed at which the axle 110 associated with the off-board-based input speed may be rotated. For example, the identified speed can be used to control the speed of the axle 110A during motoring.

If the vehicle may be braking, the output module 312 identifies a faster speed or the fastest speed of the speeds in a group that includes the fast speed of the onboard-based input speeds received from the filter module 302 (e.g., the Fastest Axle Speed) and the lower limit on the off-board-based input speed received from the processing module 308 (e.g., the GRS Speed Lower Limit). The speed that may be identified ("GRS Speed" in FIG. 3) can be used as a vehicle reference speed for the axle 110A to control the speed at which the axle 110 associated with the off-board-based input speed may be rotated. For example, the identified speed can be used to control the speed of the axle 110A during braking.

The vehicle reference speed that may be identified for the axle 110A may be communicated to the inverter controller 204A that controls operations of the inverter 206A to control the speed at which the axle 110A may be rotated. The inverter controller 204A determines the speed at which to rotate the axle 110A using the received vehicle reference speed and the inverter 206A may be controlled to rotate the axle 110A accordingly, as described above. The vehicle reference speed that may be determined for the other axles by the reference speed processing module 304 may be communicated to the inverter controllers 204B-F that control operations of the respective inverters 206B-F to control the speed at which the axles may be rotated. The inverter controllers 204B-F determine the speeds at which to rotate the axles using the received vehicle reference speed and the inverters 206B-F may be controlled to rotate the axles accordingly, as described above.

Figure 4:
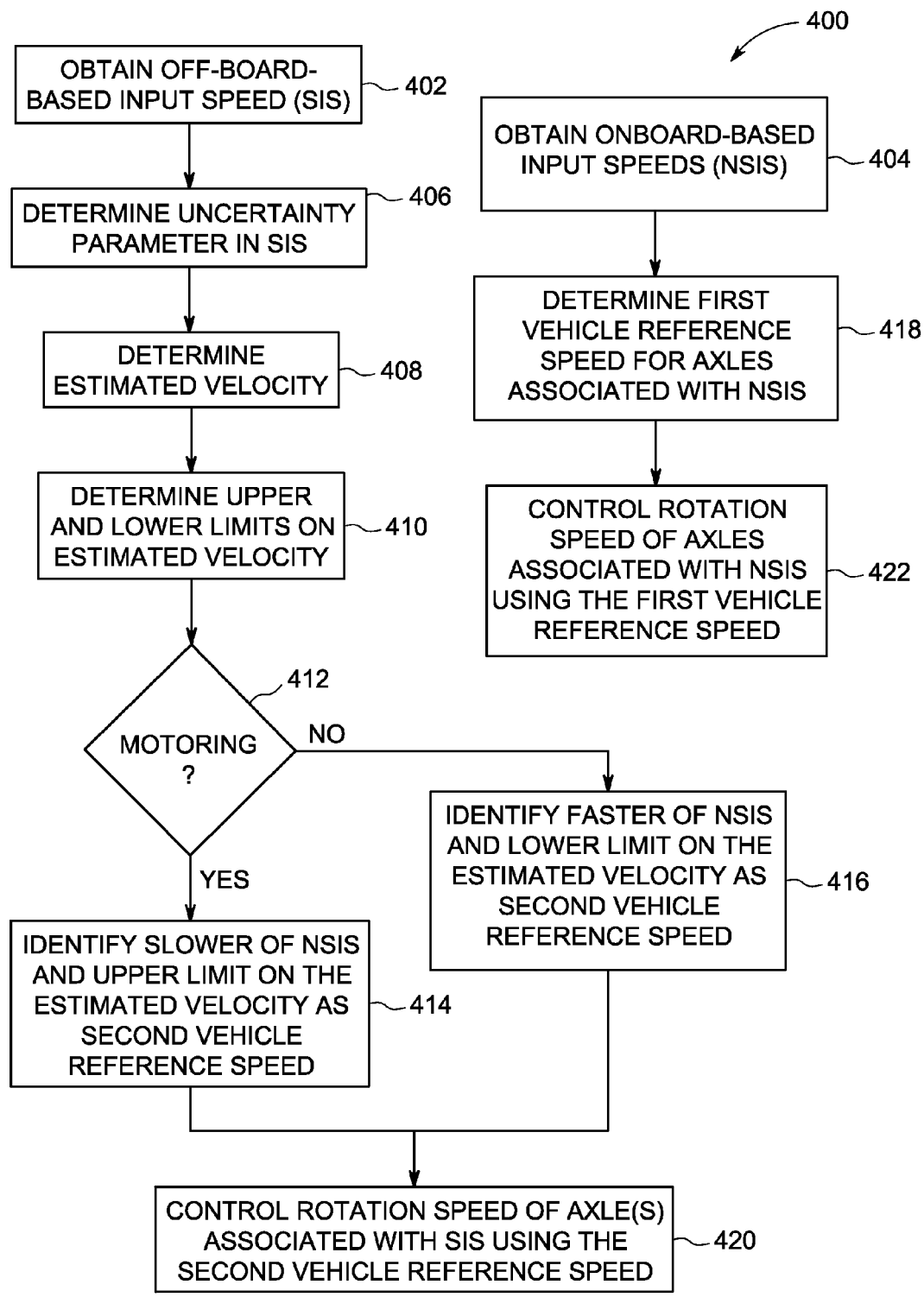
FIG. 4 is a flowchart of a method for controlling axles of a vehicle system.

FIG. 4 is a flowchart of a method 400 for controlling axles of a vehicle system. The method 400 may be used in conjunction with the vehicle system shown in FIG. 1, such as to allow for the control of movement of the vehicle system using the vehicle control systems 102, 200 (shown in FIGS. 1 and 2) described herein. The operations that may be described in connection with the method 400 need not necessarily be performed concurrently, simultaneously, or sequentially in the orders shown in FIG. 4.

At 402, an off-board-based input speed ("SIS" in FIG. 4) may be obtained. For example, a GPS-based velocity of the vehicle (shown in FIG. 1) and/or the vehicle system may be determined as the vehicle system moves along the route 108 (shown in FIG. 1). This off-board-based input speed may be associated with one or more axles (shown in FIG. 1) of the vehicle (shown in FIG. 1), such as the axle 110A or another axle 110B-F.

At 404, one or more onboard-based input speeds ("NSIS" in FIG. 4) may be obtained. For example, wheel speeds for the wheels 114 (shown in FIG. 1) connected to the axles may be measured as the onboard-based input speeds. The wheel speeds may be measured for one or more of the wheels 114 that may be not connected to the axle 110 associated with the off-board-based input speed (e.g., the axle 110A). Alternatively, the wheel speeds may be measured for the one or more of the wheels 114 connected with this axle 110.

At 406, an uncertainty parameter of the off-board-based input speed may be determined. As described above, the uncertainty parameter may represent potential inaccuracies in the off-board-based input speed, such as those caused by only receiving data signals 124 (shown in FIG. 1) from a relatively small number of off-board devices 116 (shown in FIG. 1), low signal-to-noise ratios of the data signals 124, or the like.

At 408, an estimated velocity of the vehicle (and/or vehicle system) may be determined. This estimated velocity may be calculated using the uncertainty parameter, the filtered off-board-based input speed(s), and/or the tractive effort, as described above. At 410, upper and lower limits on the estimated velocity may be determined. These limits may be calculated using the uncertainty parameter to determine a range of velocities above and below this estimated velocity of the vehicle, as described above.

At 412, a determination may be made as to whether the vehicle may be motoring or braking. For example, a decision may be made as to whether the vehicle may be generating tractive effort to propel the vehicle or if the vehicle may be generating braking effort to slow or stop movement of the vehicle. If the vehicle may be motoring, then the speeds that may be used to determine the vehicle reference speed for the axle 110 or axles associated with the off-board-based input speed may need to be slower speeds to avoid using faster speeds that may be indicative of wheel slip as a vehicle reference speed for those axle(s) 110. As a result, flow of the method 400 may proceed to 414.

On the other hand, if the vehicle may be braking, then the speeds that may be used to determine the vehicle reference speed for the axle 110 or axles associated with the off-board-based input speed may need to be faster speeds to avoid using slower speeds that may be indicative of wheel slip (e.g., where a wheel 114 may be not rolling along the route 108) as a vehicle reference speed for those axle(s) 110. As a result, flow of the method 400 may proceed to 416.

At 414, a vehicle reference speed (e.g., "second vehicle reference speed" in FIG. 4) for the axle 110 or axles associated with the off-board-based input speed may be determined. This vehicle reference speed may be determined from the slower of the onboard-based input speeds for the other axles (that may be not associated with the off-board-based input speed) and the upper limit on the estimated velocity of the vehicle.

At 416, a vehicle reference speed (e.g., "second vehicle reference speed" in FIG. 4) for the axle 110 or axles associated with the off-board-based input speed may be determined. This vehicle reference speed may be determined from the faster of the onboard-based input speeds for the other axles (that may be not associated with the off-board-based input speed) and the lower limit on the estimated velocity of the vehicle.

With respect to the axles associated with the onboard-based input speeds, at 418, a vehicle reference speed (e.g., "first vehicle reference speed" in FIG. 4) may be determined for these axles. This vehicle reference speed may be an average, median, maximum, minimum, or some other value derived from the onboard-based input speeds, as described above.

At 420 and 422, the vehicle reference speeds may be used to control the speeds at which the various axles may be individually rotated to propel the vehicle according to the power output associated with the selected throttle setting. For example, at 420, the axle 110 or axles associated with the off-board-based input speed may be rotated to a speed within a range of speeds that may be based on the second vehicle reference speed. At 422, the axle 110 or axles that may be not associated with the off-board-based input speed may be rotated to a speed within a range of speeds that may be based on the first vehicle reference speed.

The off-board-based input speeds and/or the onboard-based input speeds may be used by the control system to determine or measure one or more other operating characteristics of the vehicle. In one aspect, the control system compares onboard-based input speeds with off-board-based input speeds to calculate a creep value for one or more wheels 114 of the vehicle. The control system may calculate a difference between the onboard-based input speed associated with an axle 110 and the off-board-based input speed. This difference may represent an amount of creep for the wheels 114 connected to that axle 110. The amount of creep can represent slippage between the wheels 114 and the route 108. In some cases, a certain amount of creep (e.g., one to three percent or another value of difference between the input speeds) may be desired for increased efficiency in translating work of the engine disposed onboard the vehicle to tractive effort applied to the route 108. Too much creep, however, can result in the wheels 114 losing adhesion with the route 108 and result in reduced efficiency in translating this work. As used herein, wheel creep includes other related terminology, such as wheel slip and slip ratio, as well as other terms for loss of adhesion or traction.

The control system can compare the off-board and onboard-based input speeds for one or more of the axles to monitor the amount of creep associated with the wheels of the various axles. If the amount of creep may be too small (e.g., no greater than a designated threshold, such as no more than one percent, three percent, or another percentage), then the control system can direct the motors coupled to the axles to increase the amount of torque applied to the axles. If the amount of creep may be too large (e.g., greater than a designated threshold, such as greater than one percent, three percent, or another percentage), then the control system can direct the motors coupled to the axles to reduce the amount of torque applied to the axles.

In one aspect, the off-board-based input speeds may be based on data that may be obtained from and/or provided by the off-board devices 116 periodically, as opposed to continuously. For example, the vehicle system may receive positional and/or velocity data from the devices 116 at discrete points in time, with no positional and/or velocity data being received during the time periods that extend between these discrete points in time. During the time periods between when the position and/or velocity data may be received and/or the off-board-based input speeds may be determined, the control system may determine one or more estimated references speeds to use in controlling the torques applied by the motors. As described herein, the torques that may be applied by the motors to the axles and the speeds at which the motors rotate the axles to propel the vehicle system may be determined from a selected throttle setting of the vehicle system and a vehicle reference speed. The vehicle reference speed that may be used during the time periods between when the position data may be received and/or the off-board-based input speeds may be determined may be an estimated reference speed.

The estimated reference speed may be derived by extrapolating from previously used tractive efforts and resistive forces exerted on the vehicle system. For example, the control system may examine the tractive efforts applied by the motors of the vehicle system during a previous time period and/or the resistive forces exerted on the vehicle system during this time period to determine what estimated reference speed can be used to control the torques applied by the motors and/or rotational speeds of the motors. The estimated reference speed can be calculated so as to avoid abrupt changes in these torques or rotational speeds during the time periods between when the position and/or velocity data may be received and/or the off-board-based input speeds may be determined.

The control system may use the off-board-based input speeds and/or the onboard-based input speeds to estimate a size (e.g., mass and/or weight) of the vehicle system and/or resistive forces (e.g., drag) being experienced by the vehicle system. For example, using these input speeds, the control system may calculate acceleration of the vehicle system. The control system may know the amount of tractive effort (e.g., tractive or propulsive force) being applied by the vehicle system based on command signals used by the control system to control this tractive effort. Because the mass of the vehicle system may be proportional to the forces applied on the vehicle system and the inversely proportional to the acceleration of the vehicle system (e.g., F=ma, where F represents tractive efforts and a represents accelerations), the control system may estimate the mass of the vehicle system from the input speeds and tractive effort. For example, for larger tractive efforts and/or smaller accelerations, the control system may estimate heavier weights (e.g., masses) for the vehicle system. Conversely, for smaller tractive efforts and/or larger accelerations, the control system may estimate lighter weights (e.g., masses) for the vehicle system.

Once the size (e.g., weight or mass) of the vehicle system may be known or estimated (such as by being input into the control system by an operator using a manifest), then the control system may estimate resistive forces (e.g., drag, friction between the wheels 114 and the route 108, and the like) being experienced by the vehicle system. For example, the off-board-based and/or onboard-based input speeds may be used to calculate an acceleration of the vehicle system. The tractive efforts being applied by the vehicle system may be known, as described above. The mass and acceleration of the vehicle system may be used to estimate a total amount of force exerted on the vehicle system (e.g., F=ma, where F represents the total forces exerted on the vehicle system). If the tractive efforts may be known, the control system may estimate the resistive forces exerted on the vehicle system by removing the tractive effort component from the calculated total amount of force exerted on the vehicle system. The remaining amount of force may be an estimate of the resistive forces exerted on the vehicle system.

These resistive forces and previously applied tractive efforts can be used to estimate what tractive efforts should be applied by the motors so as to avoid abrupt changes in the torques applied by the motors and/or in the rotational speeds of the motors during the time periods between when the position and/or velocity data may be received and/or the off-board-based input speeds may be determined may be an estimated reference speed. For example, the control system may use the resistive forces and previously applied tractive efforts to calculate tractive efforts to be applied by the motors that do not significantly deviate from the previously applied tractive efforts or cause a significant change in the total forces applied to the vehicle system (e.g., where the tractive efforts and the resistive forces represent the total forces applied to the vehicle system). Based on these calculated tractive efforts, the control system determines the reference speeds to be communicated to the inverters of the motors so that the motors generate the calculated tractive efforts.

In accordance with one or more embodiments described herein, systems and methods provide for the real-time measurement of curvature in a route being traveled by a vehicle system (e.g., a single propulsion-generating vehicle or a group of one or more propulsion-generating vehicles and/or one or more non-propulsion generating vehicles mechanically coupled with each other). The term "real-time" means that the curvature of a route being traveled (referred to as "route curvature") can be measured by components disposed onboard the vehicle system as the vehicle system travels along the curvature in the route, as opposed to the vehicle system obtaining data during travel along the curvature in the route and later calculating the route curvature when the vehicle system may be no longer traveling and/or may be no longer traveling on the route curvature. As used herein, the term "curvature" or "route curvature" refers to a segment or subset of a route that may be curved (e.g., not linear). The curvature of a route may be represented by a radius of a circle or portion of another curved shape that matches or corresponds to the curvature of the route being measured.

The curvature of the route may be calculated by mathematically calculating the curvature of a rail or rails being traveled by a rail vehicle using measured speeds and/or heading of the rail vehicle. The curvature may not be determined with reference to a route database, such as a map or other memory structure that includes the curvature or layout of the route. For example, the curvature of the route may be measured without knowing the layout or position of the route. The measured curvature may be used to automatically control operations of the vehicle, as described below.

In one aspect, the systems and methods described herein may measure route curvature without reference to or obtaining information from a route database that has previously measured or input information about the curvature of the route being traveled along. For example, the systems and methods described herein may determine the curvature of a route without obtaining previously calculated estimates of the curvature that may be stored in an onboard or off-board database (or other memory device or structure). Additionally or alternatively, systems and methods described herein may use the onboard measurement of the route curvature to validate and/or replace curvature data that was previously determined and stored in the database. For example, if the route curvature that may be measured during travel over a segment of a route does not correspond or match (e.g., may be not within a designated numerical range) of a previously measured curvature of the segment of the route that may be stored in a database or other memory structure, then the route curvature that may be currently measured may be stored in the database to replace or otherwise supplant the previously measured curvature.

Measuring the route curvature during travel along a route can provide for improved performance and control of the vehicle system. For example, measuring the route curvature can allow the operator or automatic control of the vehicle system to modify tractive efforts and/or braking efforts of one or more of the vehicles in the vehicle system to ensure that forces exerted on mechanical couplers (that link the vehicles with each other) stay within prescribed limits. Curved segments of the route can impact these forces, and measuring the curvatures during travel on the curved segments can allow for the vehicle system to be manually and/or automatically controlled to ensure that any changes to these coupler forces caused by the curvature may be modified by control of tractive efforts and/or braking efforts to ensure that the coupler forces do not become too positive (e.g., as tensile forces that could cause the couplers to break) or too negative (e.g., as compressive forces that could cause the vehicles in the same vehicle system to collide).

As another example, the vehicle system may be traveling along the route according to a trip plan that designates operational settings of the vehicle system as a function of time and/or distance along the route. The measured curvatures of the route that may be measured during travel of the vehicle system along the route may be used to create and/or modify the trip plan during travel of the vehicle system. For example, the operational settings designated by the trip plan may include the speed of the vehicle system, acceleration of the vehicle system, tractive efforts produced by the vehicle system, braking efforts produced by the vehicle system, throttle settings of the vehicle system, and the like. The operational settings may be used to direct manual control of the vehicle system (e.g., by coaching or directing an operator to manually control the vehicle system according to the trip plan) and/or to automatically control operations of the vehicle system. Traveling according to the trip plan can result in improved performance of the vehicle system in that the designated operational settings of the trip plan can reduce fuel consumption and/or emissions generation of the vehicle system (relative to the same vehicle system traveling over the same route(s) for the same trip, but using manual control without a trip plan or using a trip plan that designates different operational settings).

For one or more reasons, the designated operational settings of the trip plan may result in the vehicle system consuming more fuel, generating more emissions, producing larger coupler forces, or the like, than may be desired (e.g., by exceeding one or more previously designated thresholds). This may occur when the trip plan may be created using erroneous or outdated information, such as incorrect curvatures of the route. During travel of the vehicle system along a route according to the trip plan, the vehicle system can measure the route curvature in one or more segments of the route as the vehicle system travels over the one or more segments and compare the measured route curvatures with the route curvatures on which the trip plan may be based. If these curvatures do not match (e.g., may be not within a previously designated numerical range of each other), then performance of the vehicle system may suffer relative to if the route curvatures were closer to each other. For example, actual adhesion of the wheels in the vehicle system to the route may be less than desirable and result in increased fuel consumption, increased emission generation, increased coupler forces, and the like, relative to the adhesion of the wheels that was expected or planned for when creating the trip plan. One or more components of the vehicle system may modify the trip plan to account for the differences in expected and actual curvatures. For example, if the vehicle system determines that the actual curvature has a smaller radius than the expected curvature used to create the trip plan, the vehicle system may modify the trip plan to modify unexpected coupler forces, slower travel, or the like, that was not anticipated or planned for when the trip plan was created. The vehicle system may then continue along in the trip using the modified trip plan.

One or more embodiments described herein also may provide for the control of one or more adhesion-modifying devices based on a route curvature that may be measured by a vehicle system traveling along a curved segment of the route. During travel on a segment of the route that has relatively significant curvature (e.g., a relatively small radius of curvature), a lubricant may be applied to the route to reduce adhesion between the wheels of the vehicle system and the route so that the vehicle system may more easily travel through the curved segment of the route. In one aspect, the curvature of the route can be measured onboard the vehicle system and, if the curvature may be significant enough (e.g., the radius of curvature may be smaller than a designated threshold), then an adhesion-modifying device disposed onboard the vehicle system may apply lubricant to the route in response to this measurement. Additionally or alternatively, a command message may be communicated from the vehicle system to one or more off-board devices (e.g., wayside devices) disposed alongside the route in response to this measurement. This command message may direct these devices to apply lubricant to the route.

One or more embodiments described herein also may provide for detection of an intersection or a switch at an intersection between two or more routes. For example, onboard detection of the vehicle system following a curved path may indicate that the vehicle system has passed through and/or turned in an intersection between routes, and/or has traveled over or through a switch, such as a switch between two tracks traveled upon by rail vehicles.

Figure 7:
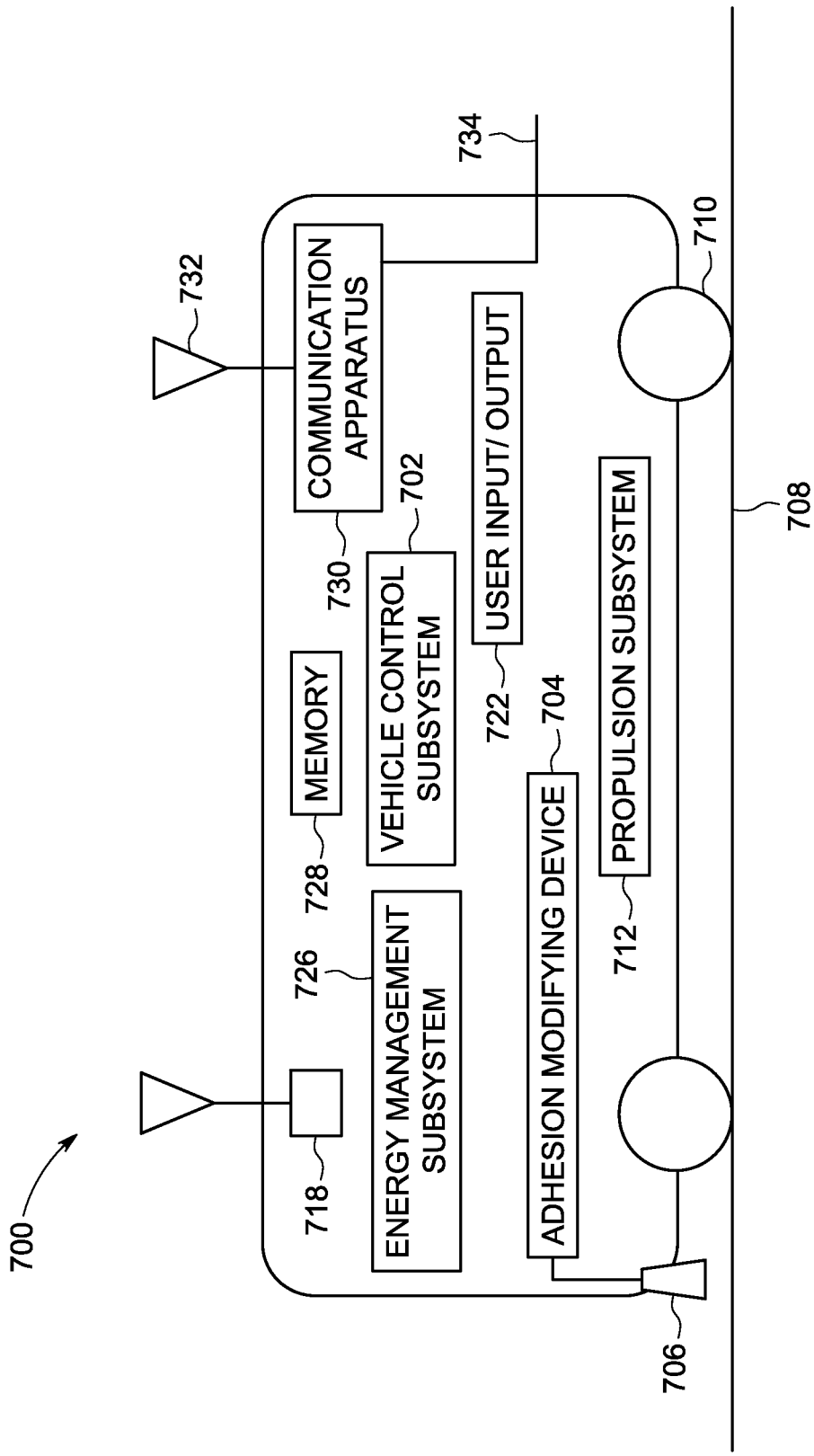
FIG. 7 is a schematic diagram of a vehicle having an embodiment of a vehicle control system.

FIG. 7 is a schematic diagram of a vehicle 700 having an embodiment of a vehicle control system 702. The vehicle in FIG. 7 is similar to the vehicle shown in FIG. 1. For example, the vehicles may differ according to details of the components onboard the vehicle as described below. Optionally, the control system 702 may be disposed onboard another vehicle, such as the vehicle 106 shown in FIG. 1.

A propulsion subsystem 712 of the vehicle 700 generates tractive effort to propel the vehicle 700 along a route 708, similar to the propulsion subsystem 112 (shown in FIG. 1). A user input and/or output device 722 ("User Input/Output" in FIG. 7) represents one or more devices that can be manually actuated to control one or more components of the vehicle 700 that may be shown in FIG. 7 and/or provide information to an operator of the vehicle 700. The device 722 can represent the user input 122 shown in FIG. 1. The device 722 can include one or more throttles, brake controls, buttons, switches, levers, touchscreens, keyboards, microphones, display screens, and the like.

An onboard energy management subsystem 726 represents one or more hardware components (e.g., one or more processors that operate based on instructions, such as software, stored on a computer readable, tangible, and/or non-transitory component, such as a computer memory 728) obtains a trip plan for controlling the vehicle 700 and/or a vehicle system that includes the vehicle 700. Optionally, the energy management subsystem 726 may be disposed off-board the vehicle 700 and/or the vehicle system that includes the vehicle 700.

The energy management subsystem 726 may obtain the trip plan by receiving the trip plan from an off-board location (e.g., a dispatch center or other location) or by creating the trip plan. The trip plan designates operational settings of the vehicle 700 and/or a vehicle system that includes the vehicle 700 (e.g., the vehicle system) to improve one or more operational variables of the vehicle 700 and/or the vehicle system, subject to one or more operating constraints of the vehicle 700 and/or vehicle system. The operational settings may include throttle settings, brake settings, speeds, accelerations, power outputs, motor rotational speeds, electric current generated by onboard generators and/or alternators, forces exerted on couplers disposed between vehicles in the vehicle system, segments of routes to be traveled on to reach a location, and/or the like. The operational settings may be designated by the trip plan as a function of time and/or distance along a trip 708 to one or more locations. For example, for a trip of the vehicle 700 or vehicle system, a trip plan may dictate different throttle settings and/or different speeds for different locations along the route 708.

The operational variables that may be improved by the trip plan can include fuel consumption, emission generation, travel time to one or more locations, and the like. The term "improve" means that the variable being referred to may be increased or decreased relative to some designated objective value. Controlling the vehicle 700 and/or vehicle system according to a trip plan that seeks to improve fuel efficiency may result in the vehicle 700 consuming less fuel, producing fewer emissions, and/or reaching a destination location in less time relative to some objective benchmark. The objective benchmark can be designated or set by an owner or operator of the vehicle 700 and/or vehicle system, a governmental body, a previous trip of the vehicle 700 and/or vehicle system along the same route 708 to the same location. For example, following the trip plan can cause the vehicle 700 and/or vehicle system consume less fuel (e.g., at least 1 to 3 percent, or another value), produce fewer emissions, and/or reach a location in less time than the previous trip of the vehicle 700 and/or vehicle system to the same location along the same route 708 where the vehicle 700 and/or vehicle system was manually controlled or not controlled according to the trip plan. In one aspect, controlling the vehicle system according to a trip plan can cause the vehicle system to consume less fuel, produce fewer emissions, and/or reach a location in less time than the same vehicle system traveling over the same routes and route segments but using one or more operational settings (e.g., throttle settings, speeds, power outputs, brake applications, or the like) that differ from the operational settings designated by the trip plan at one or more locations along the trip.

The operating constraints to which the trip plan may be subject may include speed limits, slow orders, weather conditions, upper limits on working hours of an onboard crew, a schedule for the vehicle system, and the like. These operating constraints may prevent the trip plan from directing the vehicle system to travel too slow, apply the brakes too many times, and the like, so that the constraints may be satisfied (e.g., not violated).

The energy management subsystem 726 can create and/or modify the trip plan onboard the vehicle 700, and/or can receive the trip plan from an off-board location, such as a dispatch center or other location not on board the vehicle system that includes the vehicle 700. A communication apparatus 730 includes communication hardware and associated circuitry and software (where applicable) for communicating information between the vehicle 700 and one or more other vehicles of the same vehicle system, one or more other vehicles in another vehicle system, or an off-board location. For example, the communication apparatus 730 can include transceiver circuitry, an antenna 732 for wireless communication, one or more routers, modems, and the like for communicating via a wired connection 734 (e.g., a conductive pathway extending between vehicles in the vehicle system, such as a multiple unit line, train line, electronically controlled pneumatic brake line, or the like). The communication apparatus 730 can receive information used by the energy management subsystem 726 to create and/or modify a trip plan, can receive a trip plan, and/or can communicate a trip plan with one or more other vehicles, vehicle systems, and/or off-board locations.

The vehicle 700 includes an adhesion modifying device 704 that may be controlled to change adhesion of wheels 710 of the vehicle 700 to the route 708. For example, the device 704 may include a blower or fan that directs air (e.g., cold air, hot air, or room temperature air) onto the route 708 to clear the route 708 of debris (and thereby increase adhesion between the wheels and the route 708). As another example, the device 704 may dispense a substance onto the route 708, such as sand, gravel, an adhesive, or the like, to change adhesion between the wheels and the route 708. The device 704 can apply a lubricant, such as an oil, onto the route 708 to reduce adhesion and assist with movement of the vehicle system. For example, when traveling over curved segments of the route 708, a lubricant can be applied to the route 708 to allow the wheels of the vehicle system to more easily move along the route 708. The device 704 may be manually and/or automatically controlled by the control system 702. Optionally, the adhesion modifying device 704 may be disposed off-board of the vehicle 700 but may be controlled using signals communicated from the vehicle 700.

The vehicle 700 includes a position and/or velocity data receiver 718 that may be similar or identical to the position and/or velocity data receiver 118 shown in FIG. 1. Using position and/or velocity data (e.g., position and/or velocity data signals) acquired by the position and/or velocity data receiver 718, the vehicle 700 (e.g., the vehicle control system 702) can measure curvatures of the route 708 being traveled by the vehicle 700. The position and/or velocity data can be received from off-board devices, such as the devices 116 shown in FIG. 1.

Figure 8:
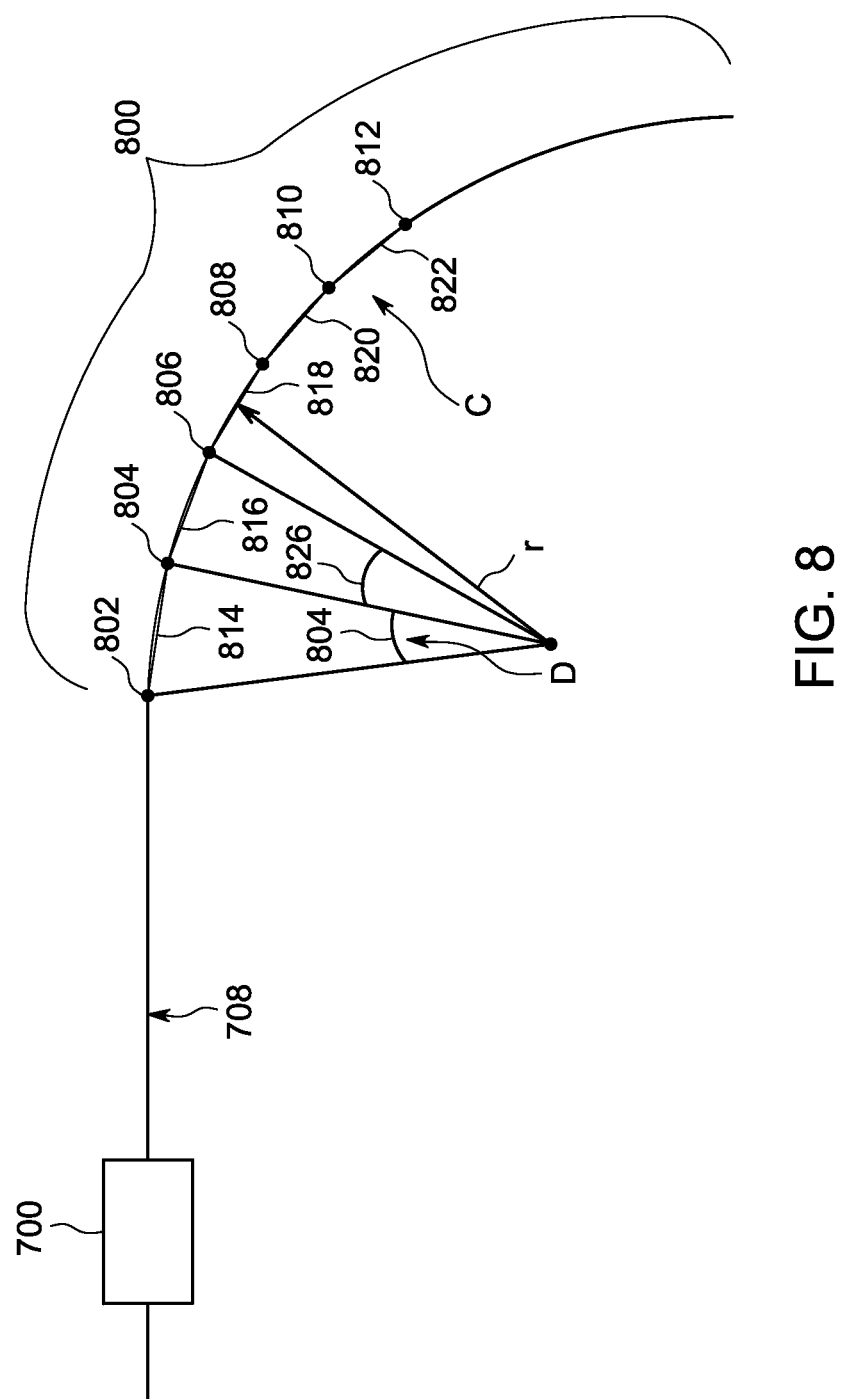
FIG. 8 illustrates a schematic diagram of one example of the vehicle shown in FIG. 7 traveling along a segment of a route.

With continued reference to the vehicle 700 shown in FIG. 7, FIG. 8 illustrates a schematic diagram of one example of the vehicle 700 traveling along a segment 800 of the route 708. The vehicle 700 may be included in a larger vehicle system that may be not shown in FIG. 8. During travel along the route 708, the position and/or velocity data receiver 718 obtains position and/or velocity data signals from the off-board devices 116 to determine headings of the vehicle 700. As used herein, the heading of the vehicle 700 refers to the course or direction of travel of the vehicle 700. For example, the vehicle 700 may have a heading of 90° when the vehicle 700 travels east, a heading of 180° when the vehicle 700 travels south, a heading of 270° when the vehicle 700 travels west, a heading of 0° when the vehicle 700 travels north, and so on. The heading may be communicated to the position and/or velocity data receiver 718 in the signals received from the off-board devices 116. Optionally, the heading may be derived from position and/or velocity data received from the off-board devices 116. For example, if the position and/or velocity data signals indicate the geographic location (e.g., longitude, latitude, and/or elevation) of the vehicle 700, then position and/or velocity data signals for two or more different locations may be used to calculate the heading of the vehicle 700.

In one aspect, only headings of the vehicle 700 are used to determine curvatures of routes being traveled upon. For example, the systems and methods described herein may calculate or estimate curvatures of a curved route segment using GPS headings, and not using any geographic locations or coordinates, such as GPS coordinates.

The position and/or velocity data signals may be acquired and/or the headings of the vehicle 700 may be determined periodically, upon manual prompt by the operator of the vehicle 700 (e.g., using user input/output 722), in response to one or more events, or the like. The events that may cause the acquisition of data signals and/or determining the heading may include the heading of the vehicle 700 deviating from a designated heading (e.g., as acquired from the memory 728) by at least a designated amount (and thereby indicating that the designated curvature of the route 708 may not match or correspond with the actual curvature). Optionally, actual operations of the vehicle 700 deviating from the operations designated by a trip plan (e.g., actual speed does not match the designated speed) may cause the heading of the vehicle 700 to be determined.

In the illustrated example, the headings of the vehicle 700 may be determined from the signals received from the off-board devices 116 for locations 802, 804, 806, 808, 810, 812 of the vehicle 700. The radius of curvature (e.g., the curvature of the route segment 800) may be determined from these headings. For example, the radius of curvature of the route segment 800 may be calculated from one or more of the following relations:

$$r = \frac{2\pi C}{360D} \quad \text{(Equation \#1)}$$

where r represents the radius of curvature of the route segment 800, C represents a chord length, and D represents a degree of curvature of the route segment 800. The chord length C may be a straight-line distance between two of the locations 802, 804, 806, 808, 810, 812 where the heading may be determined. For example, chord lengths 814, 816, 818, 820, 822 may be used. Optionally, chord lengths may be measured between two or more other locations 802, 804, 806, 808, 810, 812, such as locations 802 and 806, 804 and 812, or the like. The chord length C may be a designated distance, such as 100 feet (e.g., 30.48 meters). Or, the chord length C may change based on the time period between when the headings may be measured and how fast the vehicle 700 may be traveling. For example, the chord length C will increase if the time period between determining the headings and/or the speed increases.

The degree of curvature D of the route segment 800 may represent a deflection angle (measured in degrees, for example) that may be subtended (e.g., bounded by) the chord length C. In the examples shown in FIG. 8, the chord length 802 may be associated with a degree of curvature 824, the chord length 804 may be associated with a degree of curvature 826, and so on. The degree of curvature D for a chord length C can be determined from the following relation:

$$D = \frac{d(\text{heading})/dt}{d(\text{distance})/dt} = \frac{d(\text{heading})/dt}{v} \quad \text{(Equation \#2)}$$

where d(heading)/dt represents the change in the heading of the vehicle 700 with respect to time, and both d(heading)dt and v represent resent the moving speed of the vehicle 700.

In one aspect, the control system 702 may use "rollover protection" to prevent relatively small changes in the heading of the vehicle 700 across the magnetic north direction from being confused with more significant changes in headings. For example, if a heading along magnetic north may be referred to by an angle of zero degrees, then a heading that changes from slightly east of north (e.g., 2 degrees) to slightly west of north (e.g., 357 degrees) may be treated by the control system 702 as a change of 5 degrees (e.g., moving from 2 degrees to 357 degrees across magnetic north) as opposed to a change of 355 degrees (e.g., moving from 2 degrees to 357 degrees without crossing magnetic north). The control system 702 may use this rollover protection if the change in headings may be larger than a designated threshold. This threshold may change or be based on the rate at which the headings may be obtained. For example, the heading threshold may increase when the headings may be measured less frequently (and, as a result, a larger change in heading may be more realistically possible). Conversely, the heading threshold may decrease when the headings may be measured more frequency (and, as a result, a larger change in heading may be less realistically possible).

The control system 702 may filter the rate of heading change (e.g., d(heading)/dt) based on the speed of the vehicle 700. For example, the control system 702 can apply a spatial low pass filter that filters more of the rates of heading change when the vehicle speed increases and that filters less of the rates of heading change when the vehicle speed decreases. For example, the control system 702 may remove some of the rates of heading change from the calculation of the radius of curvature. The rates of heading change that may be removed or not used in the calculation of the radius of curvature can be based on the speed of the vehicle 700. As the speed of the vehicle 700 increases, more of the rates of heading change may be eliminated or not used to calculate the radius of curvature. As the speed of the vehicle 700 decreases, less of the rates of heading change may be eliminated or not used to calculate the radius of curvature.

In one aspect, the heading of the vehicle 700 that may be monitored by the control system 702 may be reset responsive to one or more events. The heading may be reset by changing or setting the value of the heading to a designated amount, such as zero or another direction. The events that may cause the resetting of the heading may include the uncertainty parameter (described above) becoming too large, such as larger than a first designated threshold. Another event may be the signal-to-noise ratio 626 of the signals 124 received from the off-board devices 116 falling below a second designated threshold. Another event may be the number of off-board devices 116 from which the signals 124 may be received by position and/or velocity data receiver 118 being less than a third designated threshold, or no greater than a fourth designated threshold.

The radius of curvature R of the route 708 may be measured one or more times during travel of the vehicle 700 over the segment 800 and compared to a previously designated or measured curvature of the segment 800. For example, the currently measured curvature may be compared to the curvature stored in the memory 728 of the vehicle 700 and/or the curvature used to create or modify the trip plan. If the measured curvature may be different from the curvature stored in the memory 728 and/or used to create or modify the trip plan (e.g., by at least a designated amount), then the stored curvature may be replaced or updated with the measured curvature and/or the trip plan may be modified with the updated curvature.

The control system 702 may estimate forces exerted on the couplers that mechanically couple the vehicles in the vehicle system with each other. For example, the control system 702 may estimate these forces based on the curvature of the route segment being traveled upon by the vehicle system. For smaller radii of curvature, the control system 702 may estimate greater forces (e.g., larger compressive forces or larger tensile forces) relative to larger radii of curvature. The control system 702 may warn an operator when the estimated coupler forces may be growing too large (e.g., using the user input/output 722) and/or automatically modify control of the vehicle system. For example, the control system 702 may direct the operator to manually slow movement of the vehicle system and/or automatically slow movement of the vehicle system when the estimated coupler forces grow too large.

The control system 702 may modify the adhesion of the wheels to the route 708 based on the curvature of the route 708 that may be measured. In response to measuring the curvature of the route 708 being traveled on (e.g., when the radius of curvature may be smaller than a designated radius), the control system 702 may direct the operator to manually control the adhesion modifying device 704 and/or may automatically control the device 704 to change one or more characteristics of the route 708 as the vehicle 700 travels over the route 708 to modify adhesion of the wheels 710 of the vehicle 700 on the route 708. By way of example, the adhesion modifying device 704 may apply one or more friction-modifying substances to the route 708 that change the coefficient of friction between the wheels 710 and the route 708 (e.g., sand, lubricant, or the like). Optionally, the adhesion modifying device 704 may direct the flow of a fluid (e.g., gas such as air, liquid, or the like) toward the route 708 to clean the route 708. In another example, the adhesion modifying device 704 may physically or mechanically engage the route 708 to clean the route 708. Optionally, the adhesion modifying device 704 may engage the route 708 to remove a portion of the route 708, such as by sanding the route 708.

The adhesion modifying device 704 may include two or more applicator devices 706 through which friction-modifying substances (e.g., air, sand, lubricant, and the like) may be applied to the route 708 and/or the device 704 engages the route 708. With respect to rail vehicles, the device 704 may include an applicator device 706 over each one of the rails being traveled along. The applicator devices 706 can include nozzles that direct friction-modifying substances toward the route 708, brushes that clean the route 708, or the like.

Additionally or alternatively, one or more of the applicator devices 706 can represent a sanding device that removes part of the route 708. For example, such a sanding device can engage the route 708 and sand down (e.g., smoothen) the top surface of the route 708 that may be engaged by the sanding device. With respect to rail vehicles, the top sides of the rails can become damaged. Sanding these top sides of the rails can remove the damage and prolong the life of the rails by preventing the damage (e.g., cracks and microcracks) from spreading.

In one aspect, the control system 702 and/or the adhesion modifying device 704 can control how much friction modifying substances may be applied to the route 708 based on the curvature of the route 708 that may be measured. For example, the control system 702 and/or the adhesion modifying device 704 may apply greater amounts of lubricant to the route 708 for segments of the route 708 having smaller radii of curvature relative to segments of the route 708 having larger radii of curvature. The increased amount of lubricant may assist the vehicle 700 in more easily traveling over the smaller radii of curvature, where the wheels 710 may otherwise have more friction with the route 708 relative to larger radii of curvature.

The control system 702 and/or the adhesion modifying device 704 can control the what type of friction modifying substances may be applied to the route 708 based on the curvature of the route 708 that may be measured. For example, the control system 702 and/or the adhesion modifying device 704 may apply substances (e.g., lubricant) that reduce the coefficient of friction between the wheels 710 and the route 708 for radii of curvature in the route 708 that may be smaller than a threshold radius and apply substances (e.g., sand) that increase this coefficient of friction for larger radii of curvature.

The control system 702 and/or the adhesion modifying device 704 can control the rate at which the friction modifying substances may be applied to the route 708 based on the curvature of the route 708 that may be measured. For example, the control system 702 and/or the adhesion modifying device 704 may friction modifying substances at a larger rate of flow for segments of the route 708 having smaller radii of curvature relative to segments of the route 708 having larger radii of curvature. The increased rate of substances may assist the vehicle 700 in more easily traveling over the smaller radii of curvature by applying more of the substance.

The control system 702 may use the radius of curvature that may be measured and the heading of the vehicle 700 to determine whether to deactivate the device 704 and/or one or more of the applicator devices 706. Optionally, the control system 702 may use the radius of curvature that may be measured to change a position of one or more of the applicator devices 706.

Figure 10:
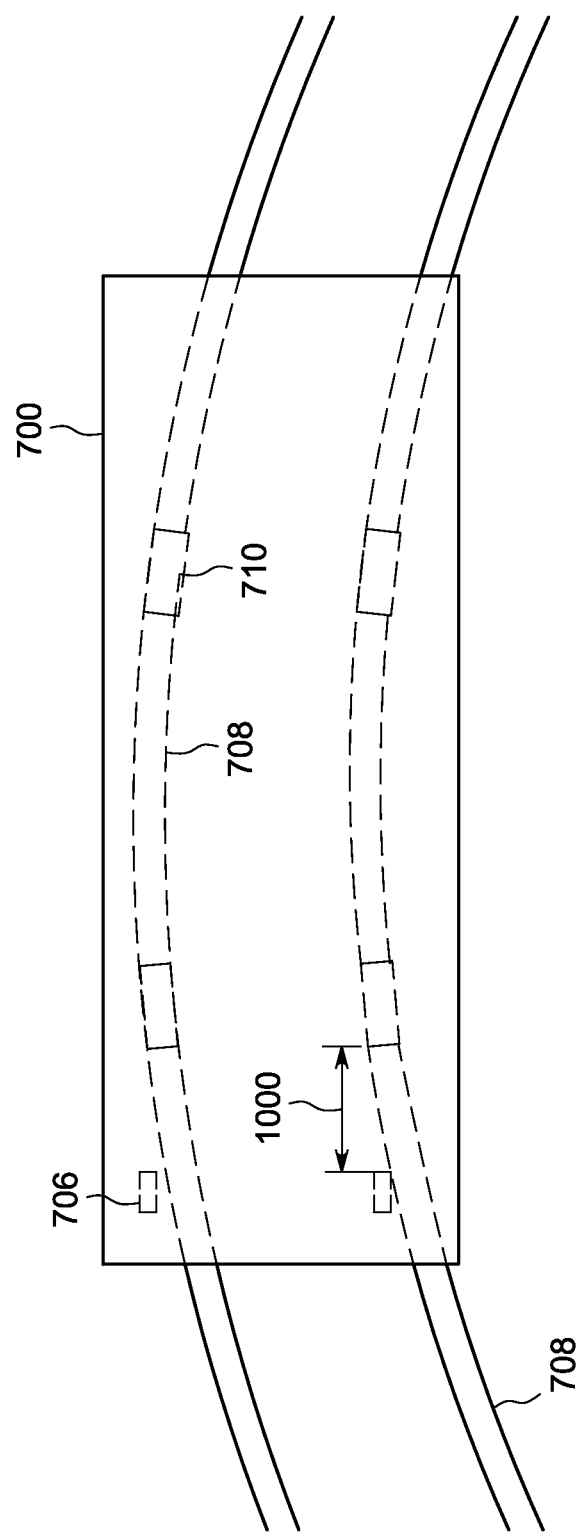
FIG. 10 illustrates a top view of the vehicle shown in FIG. 7 traveling over a curved segment of the route.

FIG. 10 illustrates a top view of the vehicle 700 traveling over a curved segment of the route 708. As shown, the curvature of the route 708 causes the applicator devices 706 of the adhesion modifying device 704 to not be located over the route 708. For example, a distance 1000 between the wheels 710 of the vehicle 700 and the applicator devices 706 may be sufficiently long and the curvature of the route 708 may be sufficiently small to cause the applicator devices 706 to be located between tracks that form the route 708 and/or be disposed outside of the route 708, as shown in FIG. 10.

The control system 702 may deactivate those applicator devices 706 that may be pointed away from the route 708 (e.g., tracks) when the measured curvature of the route 708 may be smaller than a designated threshold. For example, when the vehicle 700 may be traveling over a relatively tight curve in the route 708, the applicator devices 706 may be positioned such that any friction-modifying substances will not be applied to the route 708 and/or the applicator devices 706 do not engage the route 708. The control system 702 may compare the measured radius of curvature to the designated threshold to determine if the applicator devices 706 may be disposed over and/or may be engaging or positioned to engage the route 708. If the measured radius may be at least as large as the threshold, then the applicator devices 706 may be directed toward the route 708 such that the friction-modifying substances delivered from the devices 706 will be applied to the route 708 and/or such that the devices 706 engage or may be positioned to engage the route 708. As a result, the control system 702 may activate or keep the devices 704, 706 active to apply the friction-modifying substances to the route 708 and/or engage the route 708.

If the measured radius may be not as large as the threshold, then the applicator devices 706 may not be directed toward the route 708 such that the friction-modifying substances delivered from the devices 706 will not be applied to the route 708 and/or such that the devices 706 do not engage or may be not positioned to engage the route 708. Allowing such applicator devices 706 to apply the friction-modifying substances may actually result in the substances being applied to the ground between or outside of the rails, which can waste the supply of the substances and/or stir up dirt, debris, and the like, and further negatively impact adhesion of the wheels to the route 708. As a result, the control system 702 may deactivate or otherwise prevent the devices 704, 706 from applying the friction-modifying substances to the route 708 and/or from engaging the route 708.

Figure 11:
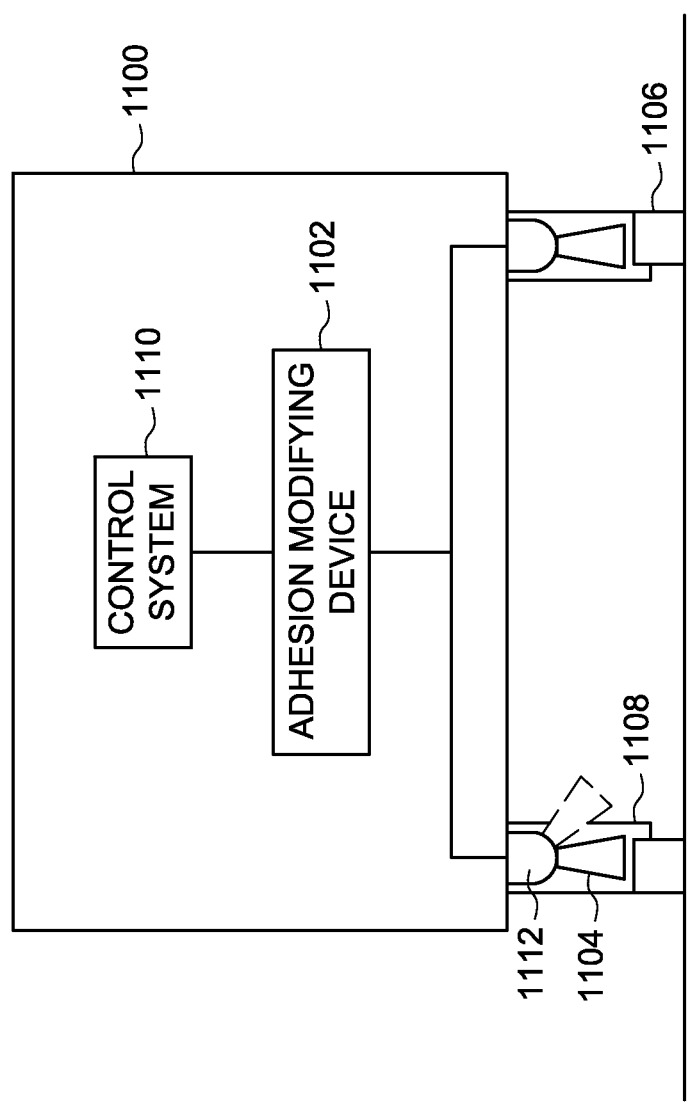
FIG. 11 is a front view of an embodiment of a vehicle.

FIG. 11 is a front view of an embodiment of a vehicle 1100. The vehicle 1100 may represent one or more of the vehicles 104, 106, 700 shown in FIGS. 1 and 7, or another vehicle. The vehicle 1100 includes a control system 1110 (such as the control system 702) and an adhesion modifying device 1102 (such as the device 704). The adhesion modifying device 1102 controls applicator devices 1104, similar to the actuator devices 706, to apply friction-modifying substances to a route 1106 that may be being traveled by the vehicle 1100, to clean the route 1106, to sand the route 1106, and the like. Although the route 1106 may be shown as being parallel tracks being traveled upon by wheels 1108 of a rail vehicle, the route 1106 may optionally be a road or other surface.

The applicator devices 1104 may be connected to actuators 1112 that may be controlled by the adhesion modifying device 1102 to move the applicator devices 1104. The actuators 1112 may include or represent one or more motors (e.g., servo motors, pneumatic motor, electric motor, or the like), gears, pinions, screws, wheels, axles, or the like, that may be controlled by the adhesion modifying device 1102 to change an orientation of the applicator devices 1104. As shown in FIG. 11, the actuators 1112 may move the applicator devices 1104 by turning the applicator devices 1104 inward (e.g., to the right in the view of FIG. 11 and as shown in dashed lines) and/or outward (e.g., to the left in the view of FIG. 11). The actuators 1112 may be controlled to move the applicator devices 1104 to point inward or outward and, as a result, direct friction-modifying substances inward or outward relative to the vehicle 1100, engage the route 1108 at an angle, or the like.

The control system 1110 may use the measured curvature of the route 1106 to direct the adhesion modifying device 1102 to control the orientation of the applicator devices 1104. For example, as described above in connection with FIG. 10, the curvature of the route 1106 may be sufficiently small that the applicator devices 1104 may be located outside of the route 1106 (e.g., such that an applicator device 1104 may be outside of the curved segment of the route 1106) and/or inside of the route 1106 (e.g., such that an applicator device 1104 may be inside the curved segment of the route 1106 or disposed above a location that may be between the tracks of the route 1106). In such a situation, the control system 1110 may direct the adhesion modifying device 1102 to control the actuators 1112 to change the orientation of the applicator devices 1104. The actuator 1112 connected to the applicator device 1104 that may be outside of the curved segment of route 1106 may bias (e.g. move) the applicator device 1104 inward, so that the applicator device 1104 may be directed more toward the route 1106 than the applicator device 1104 would be without biasing the device 1104. The actuator 1112 connected to the applicator device 1104 that may be inside of the curved segment of route 1106 may bias (e.g. move) the applicator device 1104 outward, so that the applicator device 1104 may be directed more toward the route 1106 than the applicator device 1104 would be without biasing the device 1104.

The control system 1110 may decide when to bias the applicator devices 1104 by comparing the measured curvature of the route 1106 to one or more designated thresholds. These thresholds may represent different curvatures of the route 1106 and may be separately associated with different amounts of biasing (e.g., movement) of the applicator devices 1104. Depending on which of the thresholds may be exceeded and/or not exceeded by the measured curvature of the route 1106, the control system 1110 may direct the adhesion modifying device 1102 to control the actuators 1112 and change the orientations of the applicator devices 1104 by different amounts. For example, for smaller radii of curvature in the route 1106, the actuators 1112 may move the applicator devices 1104 by greater amounts relative to larger radii of curvature in the route 1106.

Figure 9:
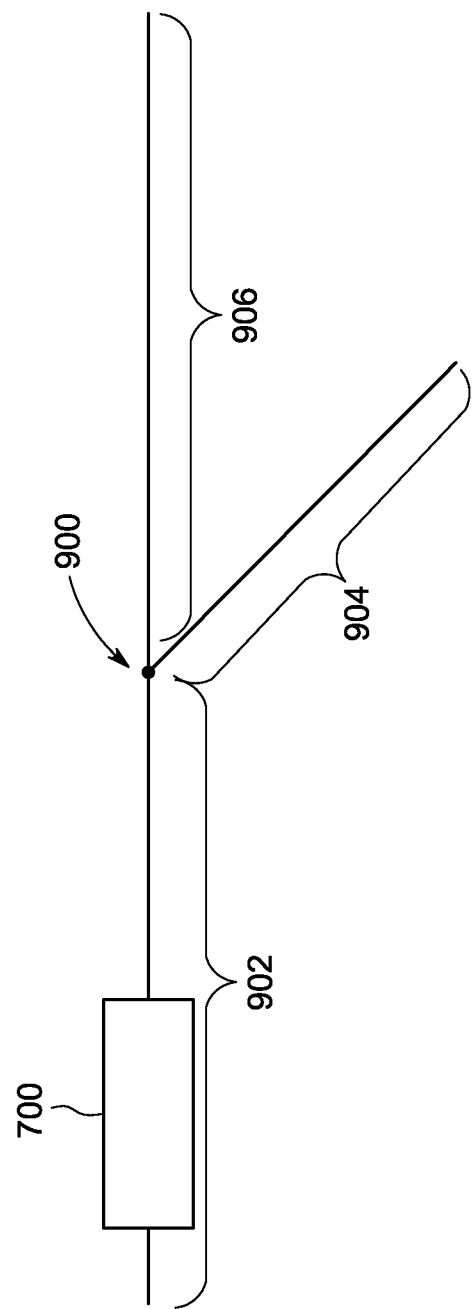
FIG. 9 illustrates one example of the vehicle shown in FIG. 7 traveling toward a switch in the route.

With renewed reference to the vehicle 700 shown in FIG. 7, FIG. 9 illustrates one example of the vehicle traveling toward a switch 900 along the route 708. The switch 900 represents a mechanism that can be actuated to direct which of two or more route segments 902, 904, 906 of the route that the vehicle travels on when the vehicle travels through or over the switch 900. For example, in a first state or position, the switch 900 may direct the vehicle 700 to travel from the route segment 902 to the route segment 904. In a different, second state or position, the switch 900 may direct the vehicle 700 to travel from the route segment 902 to the route segment 906.

The control system 702 can detect which route segment 902, 904 may be being traveled upon when the vehicle 700 travels over the switch 900 and/or detect the state of the switch 900 based on the route curvature that may be measured. For example, as the vehicle 700 travels over the switch 900, the control system 702 can measure the route curvature as described above. The relative locations of the route segments 902, 904, and/or 906 may be known (e.g., stored in the memory 728). Based on the route curvature that may be measured, the control system 702 can determine if the vehicle 700 traveled from the route segment 902 to the route segment 904 or from the route segment 902 to the route segment 906. For example, a larger radius of curvature that may be measured by the control system 702 may indicate that the vehicle 700 traveled from the route segment 902 to the route segment 906. A smaller radius of curvature may indicate that the vehicle 700 traveled from the route segment 902 to the route segment 904.

The control system 702 can use the identification of which route segment 904, 906 may be being traveled upon to ensure that the vehicle 700 may be not entering into a restricted area, such as a section of the route 708 that may be currently occupied by another vehicle system, that may be being repaired by a maintenance crew, that may be not along the path that the vehicle system may be to take to reach a destination, and the like. The energy management system 726 can use the identification of which route segment 904, 906 may be being traveled upon to ensure that the vehicle 700 may be traveling according to the trip plan. For example, the trip plan may dictate which route segments 902, 904, 906 that the vehicle 700 may be to travel along. Upon traveling through or across the switch 900, the control system 702 may determine that the vehicle 700 may be not traveling on a segment of the route 708 that may be designated by the trip plan. For example, the trip plan may direct the vehicle 700 to travel from the segment 902 to the segment 904, or from the segment 902 to the segment 906. If the control system 702 determines that the vehicle 700 may be not traveling on the segments designated by the trip plan (such as when the switch 900 malfunctions, may be modified to an incorrect state, or the like), then the control system 702 may notify the energy management system 726. The energy management system 726 may then modify or revise the trip plan (e.g., into a modified trip plan) to account for and include the vehicle 700 traveling on the segment of the route 708 that the vehicle 700 may be currently traveling on, but that was not included in the previous trip plan.

Figure 12:
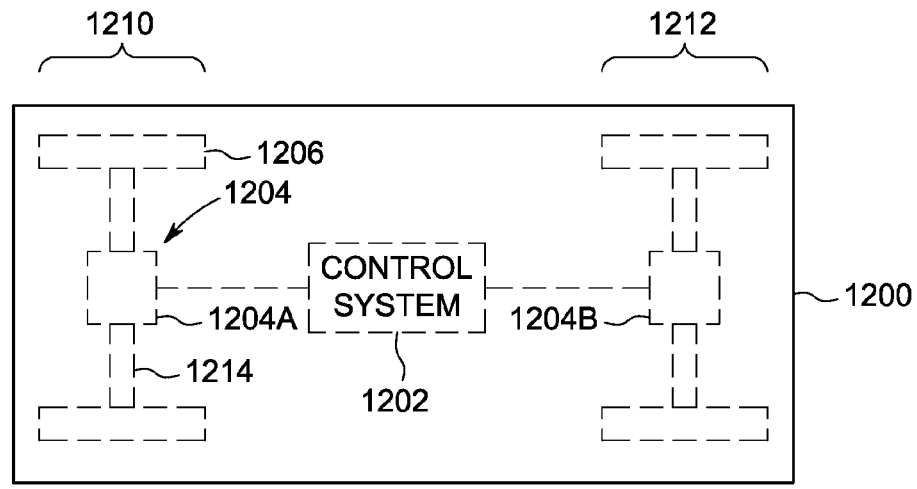
FIG. 12 illustrates a top view of an embodiment of a vehicle.
Figure 13:
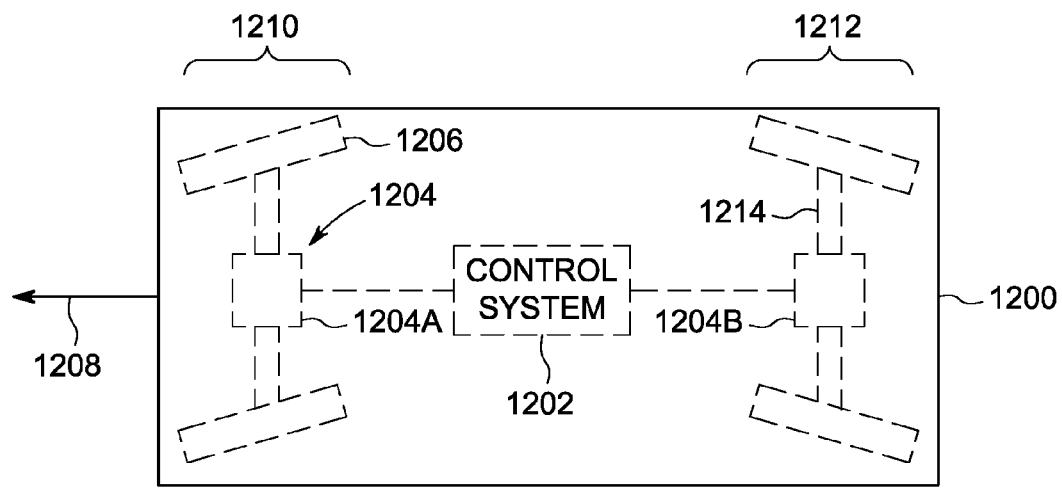
FIG. 13 illustrates another top view of the vehicle shown in FIG. 12.

FIGS. 12 and 13 illustrate top views of an embodiment of a vehicle 1200. The vehicle 1200 may represent the vehicle, 106, 700, and/or 1100 shown in FIGS. 1, 7, and 11. For example, the vehicle 1200 may be a propulsion-generating vehicle that may be capable of generating tractive effort to propel itself, such as a locomotive, or may be a non-propulsion-generating vehicle that may be incapable of generating tractive effort to propel itself, such as a railcar.

The vehicle 1200 includes a control system 1202, such as the control system, 702, or 1110. The control system 1202 may be communicatively coupled (e.g., by one or more wired and/or wireless connections) with one or more steering systems 1204 (e.g., systems 1204A, 1204B) of the vehicle 1200. The steering systems 1204 may be connected with wheels 1206 of the vehicle 1200 and can turn the wheels 1206 as shown in FIG. 13. The steering system 1204A steers the wheels 1206 of a first set 1210 of the wheels 1206 while the steering system 1204B steers the wheels 1206 of a second set 1212 of the wheels 1206.

The steering systems 1204 can turn the wheels 1206 to allow the vehicle 1200 to more easily travel over curved segments of a route, such as the route 108, 708 (shown in FIGS. 1 and 7). For example, without being able to turn the wheels 1206, more force may be required to move the wheels 1206 and the vehicle 1200 along curved segments of the route due to the fact that the wheels 1206 may be rigidly oriented along a linear direction during travel over a curved route.

The steering systems 1204 can include or represent gears, pinions, axles, actuators, motors, or the like, for turning the wheels 1206 left or right relative to a direction of travel 1208 of the vehicle 1200. The steering systems 1204 may include or be coupled with axles 1214 that may be joined with the wheels 1206. In one aspect, one or more of the steering systems 1204 may include or represent a propulsion-generating device, such as a motor. The propulsion-generating device may be directly or indirectly coupled with one or more of the wheels 1206 or axles 1214 to rotate the wheels 1206 and/or axles 1214 and generate tractive effort to propel the vehicle 1200 along the route.

The steering system 1204A turns the wheels 1206 of the set 1210 to the left relative to the direction of travel 1208 and the steering system 1204B turns the wheels 1206 of the set 1212 to the right relative to the direction of travel 1208. The steering systems 1204 may turn the wheels 1206 in this manner when the vehicle 1200 may be traveling over a segment of the route that may be curved to the left relative to the direction of travel 1208. The steering system 1204A may turn the wheels 1206 of the set 1210 to the right relative to the direction of travel 1208 and the steering system 1204B may turn the wheels 1206 of the set 1212 to the left relative to the direction of travel 1208 when the vehicle 1200 may be traveling over a segment of the route that may be curved to the right relative to the direction of travel 1208. Optionally, the vehicle 1200 may include only one of the steering systems 1204 that turns the wheels 1206 of only a single set 1210 or 1212, or that turns the wheels 1206 of multiple sets 1210, 1212. While only four wheels 1206 and two sets 1210, 1212 may be shown, the vehicle 1200 may include a different number of wheels 1206 and/or sets 1210, 1212.

The control system 1202 may measure the curvature of a route being traveled upon (as described above) and control one or more of the steering systems 1204 to turn the wheels 1206 along the measured curvature of the route. The control system 1202 may control how far each or both of the steering systems 1204 turn the wheels 1206 based on the measured route curvature. For example, for smaller measured radii of curvature in the route, the control system 1202 may direct the steering systems 1204 to turn the wheels 1206 more than for larger measured radii of curvature in the route.

As described above, one or more of the steering systems 1204 may include a propulsion-generating device to propel the vehicle 1200. For example, the steering system 1204A and/or the steering system 1204B may include one or more traction motors that may be powered to rotate the corresponding axle 1214 and rotate the wheels 1206 connected to the axle 1214. The torques applied to the axles 1214 by the steering systems 1204 may be controlled using the curvature of a route segment being traveled on to control the shifting of weight between the axles 1214. For example, if the vehicle 1200 may be traveling on a curved segment of the route in the direction of travel 1208, the control system 1202 may measure the radius of curvature (as described above) and use this radius to change the torque applied by the steering system 1204A and/or the torque applied by the steering system 1204B to the respective axles 1214 to propel the vehicle 1200.

In one aspect, the control system 1202 may reduce the torque applied by the "rear" steering system 1204B (e.g., the steering system 1204 that follows one or more other steering systems 1204 on the same vehicle 1200 along the direction of travel 1208) and/or increase the torque applied by the "leading" steering system 1204A (e.g., the steering system 1204 that may be ahead of one or more other steering systems 1204 on the same vehicle 1200 along the direction of travel 1208. If the vehicle 1200 includes more than two steering systems 1204, then one or more of the steering systems 1204 may be both a rear steering system 1204 relative to at least one other steering system 1204 and a leading steering system 1204 relative to at least one other, different steering system 1204.

By "reduce the torque," it may be meant that the control system 1202 may reduce the torque applied by the steering system 1204B on the axle 1214 connected to the system 1204B relative to the torque applied by the steering system 1204B on the axle 1214 when the vehicle 1200 may be traveling along a straight segment of the route. In one aspect, the control system 1202 directs the rear steering system 1204B to stop applying torque to the axle 1214 (e.g., the rear steering system 1204B applies no torque to the axle 1214).

Optionally, the control system 1202 may reduce the torque applied by the steering system 1204B relative to the torque applied by the other steering system 1204A. For example, for a designated speed of the vehicle 1200 obtained from a trip plan, a manually selected throttle setting of the vehicle 1200, or another input into the control system 1202 that dictates a power output or speed of the vehicle 1200, the control system 1202 may command the traction motors of the steering systems 1204 to apply a certain amount of torque. The amount of torque applied by the steering systems 1204 on a straight segment of the route may be the same or approximately the same (e.g., with any differences due to noise in measurements of the torque, communication delays, or manufacturing variances). In one aspect of the inventive subject matter, the control system 1202 may reduce the torque applied by the rear steering system 1204 but increase the torque applied by the leading steering system 1204 responsive to and/or proportional to the measured radius of curvature of the route being traveled upon. The decrease in torque applied by one or more steering systems 1204 of the vehicle 1200 may be equivalent to or substantially equivalent to the increase in torque applied by one or more other steering systems 1204 of the same vehicle 1200 such that the total torque applied by the steering systems 1204 of the vehicle 1200 remains the same or substantially the same. Optionally, the torques applied by the steering systems 1204 may change such that the total torque applied by the steering systems 1204 does not remain the same.

The torque may be decreased and/or increased by the steering systems 1204 in intervals. For example, instead of dropping the torque applied by a steering system 1204 from a current value to a reduced value, the control system 1202 may incrementally decrease the torque applied by the steering system 1204 from a current value to a final reduced value. The control system 1202 may reduce the torque by a first amount for a first non-zero time period, then an additional amount for an additional non-zero time period, and so on, until the torque may be at the final reduced value.

The torque may be decreased for the rear steering system 1204 to shift the weight of the vehicle 1200 between the axles 1214 while traveling on the curved segment of the route. Decreasing the torque applied by the rear steering system 1204 causes at least some of the weight borne by the rear steering system 1204 to be transferred to one or more other steering systems 1204 (e.g., the leading steering system 1204 or a steering system 1204 that does not reduce torque). Shifting this weight between the axles 1214 can allow a larger portion of the weight of the vehicle 1200 to be borne by the axles 1214 that lead other axles 1214 along the direction of travel 1208 and make it easier for the vehicle 1200 to maintain speed through the curved segment of the route. Once the weight has been shifted between the axles 1214, the control system 1202 can increase the torque applied by the rear steering system 1204 and/or decrease the torque applied by the leading steering system 1204.

Figure 14:
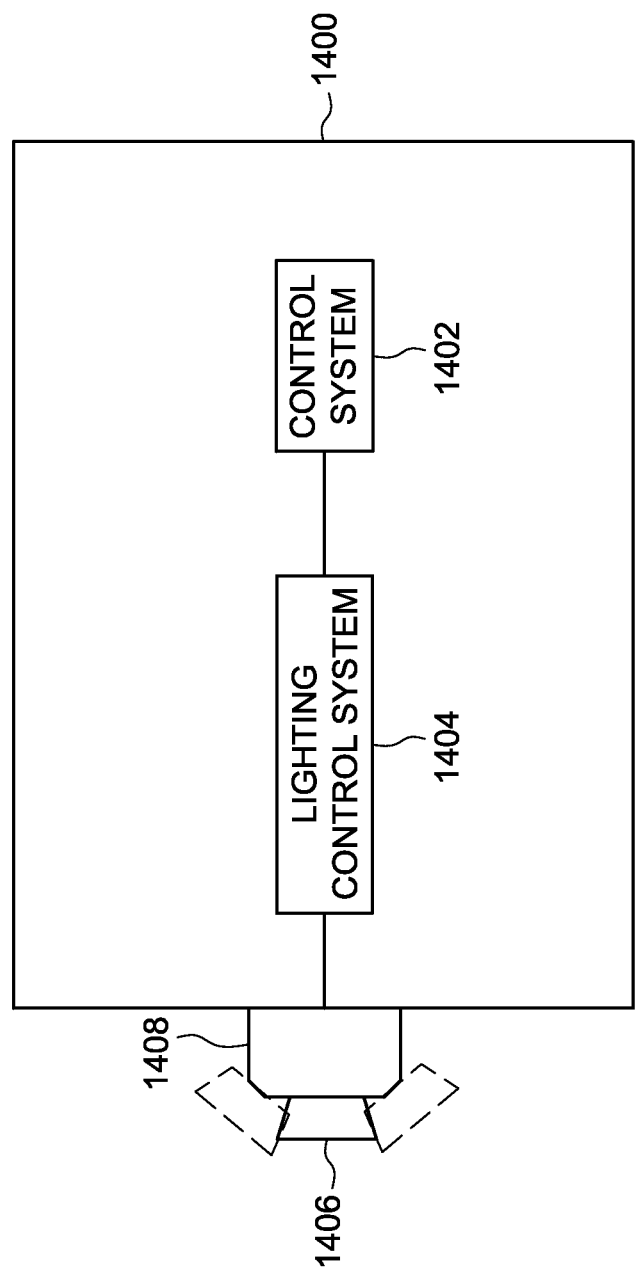
FIG. 14 is a top view of an embodiment of a vehicle.

FIG. 14 is a top view of an embodiment of a vehicle 1400. The vehicle 1400 may represent one or more of the other vehicles described herein, or another vehicle. The vehicle 1400 includes a vehicle control system 1402 (such as one or more of the vehicle control systems described herein) and a lighting control system 1404. As described above, the vehicle control system 1402 control operations of the vehicle 1400, including the determination or measurement of a curvature of the route being traveled by the vehicle 1400. The lighting control system 1404 controls operations of a lighting device 1406 that generates light to illuminate the area in front of the vehicle 1400 along a direction of travel of the vehicle 1400. For example, the lighting control system 1404 may automatically or manually control the lighting device 1406 to emit light when ambient light may be relatively low or dark.

The lighting control system 1404 controls one or more actuators 1408 that may be coupled with the lighting device 1406. The actuators 1408 may be similar to the actuators 1112 (shown in FIG. 11) in that the actuators 1408 may be controlled by the lighting control system 1404 to change an orientation of the lighting device 1406. As shown in FIG. 14, the actuators 1408 may move (e.g., turn, pivot, rotate, or the like) the lighting device 1406 by turning the lighting device 1406 left or right relative to a direction of travel of the vehicle 1400. The lighting device 1406 may be shown in FIG. 14 in dashed line in two example positions where the lighting device 1406 may be turned toward.

The control system 1402 may use the measured curvature of the route to direct the lighting control system 1404 to control the orientation of the lighting device 1406 so that the lighting device 1406 may be directed toward the route when the vehicle 1400 may be traveling on a curved segment of the route. For example, the control system 1402 may measure the curvature of the route (as described above) and report this curvature to the lighting control system 1404. The lighting control system 1404 may then determine how far to pivot or turn the lighting device 1406 to ensure that the lighting device 1406 may be oriented more toward the route (e.g., toward the center of the route) than away from the route in the curved segment of the route. For smaller radii of curvature in the route, the lighting control system 1404 may determine that the lighting device 1406 needs to be turned more to be oriented toward the route than for larger radii of the route. The lighting control system 1404 may then direct the actuators 1408 to turn the lighting device 1406 accordingly such that the lighting device 1406 may be oriented in the same direction of travel as the vehicle 1400 along the curved segment of the route.

In accordance with one or more embodiments described herein, the off-board-based input speed and the onboard-based input speeds can be used to measure wheel sizes (e.g., diameters) of the wheels of a vehicle. For example, these input speeds can be used to estimate or measure the diameters of wheels of a rail vehicle, wheels of an automobile, or wheels of another vehicle. With respect to solid wheels (e.g., the wheels of a rail vehicle), the wheel sizes can be measured to monitor wear of the track or wheels and/or to calibrate the onboard-based input speeds (e.g., due to changes or errors in an input wheel size that may be used to determine the onboard-based input speeds). With respect to non-solid (e.g., inflatable) wheels (e.g., tires of an automobile), the wheel sizes can be indicative of wear of the tires and/or air pressure of the tires. The wheel sizes can be monitored and, if a decrease may be identified, then an operator of the automobile may be warned of decreasing tire pressure, an impending flat tire, and/or a flat tire.

In one embodiment, a current wheel size may be calculated using a scale factor that may be applied to a static reference wheel size (such as the wheel size of a new wheel). Speed calculations can then use current wheel size and the wheel rotation counter or tachometer values. The current wheel size can be either placed in non-volatile memory for retrieval, as needed, and updating as available; or, can be generated and use dynamically and in near real time to avoid having to store the wheel size value and then update the stored wheel size value.

Due to errors in the measurement of the reference wheel, wear on the reference wheel during a trip, or other factors, the measured diameter of the reference wheel may initially be inaccurate and/or may become inaccurate during a trip. As a result, the onboard-based input speed that may be calculated using the diameter of the reference wheel may be or become inaccurate.

Returning to the description of the vehicle system shown in FIG. 1, in one aspect, the control system uses the off-board-based input speeds determined from data signals received from off-board devices 116 to calculate a reference wheel diameter for one or more wheels 114 of the vehicle 100. The control system also obtains the wheel speeds at which the one or more wheels 114 of the vehicle 100 rotate. As described above, these wheel speeds may be measured by the speed sensors 120. The wheels speeds may be represented in terms of revolutions per unit time of the wheels 114.

The control system may calculate the reference wheel diameter using a relationship between the off-board-based input speed and the wheel speed of one or more of the wheels 114. For example, the control system may determine a reference wheel diameter using the following:

$$d = \frac{v_{OB} * r_G * C}{rpm} \quad \text{(Equation \#3)}$$

where d represents the reference wheel diameter, $v_{OB}$ represents the off-board-based input speed, rpm represents the speed at which the reference wheel rotates (e.g., revolutions of the wheel per minute, obtained from the speed sensors 120), and $r_G$ and C represent one or more variables and/or constant values based on one or more characteristics of the vehicle system. For example, $r_G$ may represent a gear ratio for gears used to couple a motor to the axle 110 connected to the reference wheel 114 and C may represent a factor having a designated value, such as 336.13. Optionally, C may have another value.

The control system may calculate the reference wheel diameter for several, or all, of the wheels 114 in the vehicle. The reference wheel diameters may then be used to calculate or calibrate the onboard-based input speeds of the wheels 114. In one aspect, the diameters of the wheels 114 may be individually calibrated (e.g., modified) to match or be closer to the reference wheel diameter that may be calculated using the off-board-based input speed and the rotational speed of the respective wheel 114. Optionally, the diameters of a group of two or more wheels 114 may be calibrated to match or be closer to the reference wheel diameter that may be calculated using the off-board-based input speed and the rotational speed of the respective wheel 114.

The reference wheel diameters may be periodically determined during a trip of the vehicle system using the off-board-based input speeds to re-calibrate the onboard-based input speeds. These onboard-based input speeds that may be re-calibrated may be used in connection with controlling the vehicle system according to a trip plan. For example, the control system may control operations of the vehicle system (or direct an operator to control the operations) so that the speed of the vehicle system (as determined from the onboard-based input speeds) matches or corresponds with the designated speeds of a trip plan for the vehicle system.

In one aspect of the inventive subject matter, the control system may compare the off-board-based input speed with the onboard-based input speed measured for a reference wheel 114 or a reference axle 110. The reference wheel 114 may represent the wheel 114 for which an operator manually measured and/or input the size of the wheel 114 into the control system for determining the onboard-based input speed. The reference axle 110 may represent the axle 110 to which the reference wheel 114 may be joined.

If the off-board-based input speed differs from the onboard-based input speed for the reference wheel 114 or reference axle 110 (e.g., by at least a designated, non-zero threshold), then the control system may determine that this difference constitutes a relatively large error. The control system may then notify the operator of the vehicle, such as by activating one or more lights and/or speakers, displaying a warning on an output device, or the like. In response, the operator may obtain another manual measurement of the size of the reference wheel 114. For example, the operator may stop movement of the vehicle system, disembark from the vehicle system, manually measure or re-measure the size of the reference wheel 114, and input the size into the control system.

Optionally, the control system may scale or otherwise modify an input speed based on a difference between input speeds. If the off-board-based input speed differs from the onboard-based input speed, then the control system may scale the off-board-based input speeds (e.g., multiply the off-board-based input speeds by a correlation factor) to be closer to the onboard-based input speeds. For example, if the off-board-based input speeds may be 10% faster than the onboard-based input speeds, then the control system may divide future off-board-based input speeds by a factor of 1.1 (e.g., 110%) or multiply future off-board based input speeds by a factor of 0.9 (e.g., 90%). Or, if the off-board-based input speed differs from the onboard-based input speed, then the control system may scale the onboard-based input speeds to be closer to the off-board-based input speeds.

Calculation of the reference wheel diameter using the off-board-based input speeds may be used to check or monitor inflation of a tire on an automobile. The vehicle may represent an automobile and the wheels 114 may represent inflated tires of the automobile. The control system may represent an onboard computer system (e.g., having one or more processors) that compares reference wheel diameters calculated for the tires 114 using off-board-based input speeds, such as speeds derived from GPS data or other positional data. The control system may associate different reference wheel diameters with different amounts of inflation of the tires 114. When the off-board-based input speeds indicate that the diameter of a tire 114 has changed, such as due to a loss in air pressure, then the control system may notify a driver of the automobile 104. Optionally, the control system may monitor changes in the diameter of the tires 114 (as determined from the off-board-based input speeds) and notify the driver of the automobile 104 of significant changes in the diameter, such as those changes that may indicate a leak in the tire, a flat tire, or the like. In one aspect, the control system may automatically contact an off-board location, such as a repair facility or tow truck, responsive to determining that the tire pressure in one or more tires 114 has reduced and/or indicates a flat or impending flat tire.

In one aspect of the subject matter described herein, the use of positional data (e.g., geographic locations, headings, and the like) that is obtained from an off-board source may be limited to the use of only headings and/or velocities. For example, the curvature of a route segment may be determined using only headings of the vehicle system obtained from an off-board source, and not the coordinates of the vehicle system. As another example, the wheel diameter of a vehicle system may be determined using only the speed of the vehicle system, and not the headings of the vehicle system, that is obtained from an off-board source.

The systems and methods described herein may use the positional data regardless of how fast or slow the vehicle system is traveling. For example, the systems and methods described herein may not place a lower limit on the speed of the vehicle system, where travel at speeds below this limit prevent the calculation of reference speeds, wheel diameters, route curvatures, and the like. Similarly, the systems and methods described herein may not place an upper limit on the speed of the vehicle system, where travel at speeds faster than this limit prevent the calculation of reference speeds, wheel diameters, route curvatures, and the like. While one or more filters or adjustments may be made to the positional data, reference speeds, wheel diameters, route curvatures, and the like, may be made based on the moving speed of the vehicle system, the systems and methods described herein may continue to obtain positional data and calculate the reference speeds, wheel diameters, route curvatures, and the like, using that data, regardless of how fast or slow the vehicle system is moving when the positional data is acquired.

Additionally, the systems and methods described herein may use the positional data regardless of how fast or slow the vehicle system is accelerating. For example, the systems and methods described herein may not place a lower limit and/or an upper limit on the acceleration of the vehicle system, where changes in speeds below and/or above these limits, as appropriate, prevent the calculation of reference speeds, wheel diameters, route curvatures, and the like. The systems and methods described herein may continue to obtain positional data and calculate the reference speeds, wheel diameters, route curvatures, and the like, using that data, regardless of fast or slow the vehicle system is changing speeds (e.g., accelerating or decelerating) when the positional data is acquired.

In an embodiment, a method (e.g., for controlling a vehicle system) includes determining a vehicle reference speed of the vehicle system traveling along a route using an off-board-based input speed and an onboard-based input speed. The off-board-based input speed may be representative of a moving speed of the vehicle system and may be determined from data received from an off-board device. The onboard-based input speed may be representative of the moving speed of the vehicle system and may be determined from data obtained from an onboard device. The method may include, based at least in part on the vehicle reference speed, at least one of determining wheel creep for one or more wheels of the vehicle system or controlling at least one of torques applied by or rotational speeds of one or more motors of the vehicle system. The wheel creep may be determined by measuring the wheel creep, estimating the wheel creep, calculating the wheel creep, and the like.

In one aspect, the method may include controlling a speed of rotation of one or more axles of the vehicle system based at least in part on the vehicle reference speed. In one aspect, the wheel creep may be calculated using the vehicle reference speed and the speed of rotation of the one or more axles of the vehicle system. In one aspect, the method may include determining an uncertainty parameter of the off-board-based input speed. The uncertainty parameter may be representative of a potential inaccuracy of the off-board-based input speed and of a range of potential actual speeds of the vehicle system. The uncertainty parameter may be derived from the data received from the off-board-based input device. In one aspect, the method may include modifying the off-board-based input speed using the onboard-based input speed responsive to determining that the onboard-based input speed may be within the range of potential actual speeds that may be represented by the uncertainty parameter.

In one aspect, the method may include determining an estimated reference speed during time periods between when the off-board-based input speed is obtained or calculated and controlling the at least one of torques applied by or rotational speeds of the one or more motors using the estimated reference speed during the time periods between when the off-board-based input speed is obtained or calculated. In one aspect, the estimated reference speed is determined using a mass of the vehicle system and a resistive force exerted on the vehicle system. In one aspect, the estimated reference speed is determined by extrapolating from previously determined vehicle reference speeds and using at least one of the mass of the vehicle system, the resistive force exerted on the vehicle system, or previous tractive efforts applied by the one or more motors.

In an embodiment, a vehicle control system includes a vehicle controller configured to obtain an off-board-based input speed and an onboard-based input speed of a vehicle system traveling along a route. The off-board-based input speed is representative of a moving speed of the vehicle system and is determined from data received from an off-board device. The onboard-based input speed is representative of the moving speed of the vehicle system and is determined from data obtained from an onboard device. The vehicle controller also is configured to at least one of determine wheel creep for one or more wheels of the vehicle system based on the vehicle reference speed or control at least one of torques applied by or rotational speeds of one or more motors of the vehicle system based on the vehicle reference speed.

In one aspect, the vehicle controller is configured to control a speed of rotation of one or more axles of the vehicle system based at least in part on the vehicle reference speed. In one aspect, the vehicle controller is configured to calculate the wheel creep using the vehicle reference speed and the speed of rotation of the one or more axles of the vehicle system. In one aspect, the vehicle controller is configured to determine an uncertainty parameter of the off-board-based input speed that is representative of a potential inaccuracy of the off-board-based input speed and of a range of potential actual speeds of the vehicle system. The uncertainty parameter is derived from the data received from the off-board-based input device.

In one aspect, the vehicle controller is configured to modify the off-board-based input speed using the onboard-based input speed responsive to determining that the onboard-based input speed is within the range of potential actual speeds that is represented by the uncertainty parameter. In one aspect, the vehicle controller is configured to determine an estimated reference speed during time periods between when the off-board-based input speed is obtained or calculated. The vehicle controller also may be configured to control the at least one of torques applied by or rotational speeds of the one or more motors using the estimated reference speed during the time periods between when the off-board-based input speed is obtained or calculated.

In one aspect, the vehicle controller is configured to determine the estimated reference speed using a mass of the vehicle system and a resistive force exerted on the vehicle system. In one aspect, the vehicle controller is configured to determine the estimated reference speed by extrapolating from previously determined vehicle reference speeds and using at least one of the mass of the vehicle system, the resistive force exerted on the vehicle system, or previous tractive efforts applied by the one or more motors.

In an embodiment, a method (e.g., for controlling a vehicle system) includes controlling a rotational speed at which a first axle of a vehicle system is rotated by a first motor based on a throttle setting of the vehicle system and a first vehicle reference speed. The first vehicle reference speed is determined from a group of input speeds that includes an onboard-based input speed and an off-board-based input speed. The method may include controlling a rotational speed at which at least a second axle of the vehicle system is rotated by a second motor based on the throttle setting and a second vehicle reference speed. The second vehicle reference speed is determined from the onboard-based input speed. The rotational speeds of the first axle and the at least a second axle are controlled based on the respective first and second vehicle reference speeds. In one aspect, the method may include determining the first vehicle reference speed by identifying, based on whether the vehicle system is motoring or braking, a selected input speed of the group of input speeds for use as the first vehicle reference speed. In one aspect, the selected input speed is identified as the input speed in the group that is faster than one or more other input speeds in the group when the vehicle system is braking. In one aspect, the selected input speed is identified as the input speed in the group that is slower than one or more other input speeds in the group when the vehicle system is motoring.

In an embodiment, a method includes obtaining an off-board-based input speed of a vehicle system as the vehicle system travels along a route. The off-board-based input speed is obtained from signals received from one or more off-board devices and is representative of a speed of the vehicle system traveling along the route. The method may include measuring one or more non-satellite-based input speeds of the vehicle system as the vehicle system travels along the route. The one or more non-satellite-based input speeds are representative of speeds at which one or more wheels of the vehicle system rotate as the vehicle system travels along the route. The method further includes determining a first vehicle reference speed from a group of input speeds that includes at least one of the non-satellite-based input speeds and an estimated velocity of the vehicle system that is derived from the satellite-based input speed. The method includes determining a second vehicle reference speed from the one or more non-satellite-based input speeds and controlling a speed at which a first axle of the vehicle system is rotated by a first motor based on a throttle setting of the vehicle system and the first vehicle reference speed. The method further includes controlling a speed at which at least a second axle of the vehicle system is rotated by a second motor based on the throttle setting and the second vehicle reference speed. The speeds of the first axle and the at least a second axle are concurrently controlled based on the respective first and second vehicle reference speeds.

In one aspect, determining the first vehicle reference speed includes identifying a selected input speed of the group of input speeds for use as the first vehicle reference speed based on whether the vehicle system is motoring or braking. In one aspect, the selected input speed is identified as the input speed in the group that is faster than one or more other input speeds in the group when the vehicle system is braking. In one aspect, the selected input speed is identified as the input speed in the group that is slower than one or more other input speeds in the group when the vehicle system is motoring. In one aspect, obtaining the satellite-based input speed includes receiving position and/or velocity data signals from one or more global positioning system (GPS) satellites and determining the satellite-based input speed from the position and/or velocity data signals.

In one aspect, the method determines an uncertainty parameter of the satellite-based input speed that is indicative of a potential difference between the satellite-based input speed and the actual speed of the vehicle system and calculating the estimated velocity of the vehicle system using the uncertainty parameter and a tractive effort generated by the vehicle system. In one aspect, the vehicle system may be a rail vehicle in consist. In one aspect, at least one of obtaining the satellite-based input speed, determining the first vehicle reference speed, determining the second vehicle reference speed, controlling the speed at which the first axle is rotated, or controlling the speed at which the second axle is rotated is performed by one or more processors.

In an embodiment, a vehicle control system includes a vehicle controller, one or more speed sensors, and one or more inverter controllers. The vehicle controller is configured to obtain a satellite-based input speed of a vehicle system as the vehicle system travels along a route. The satellite-based input speed is obtained from signals received from one or more satellites and representative of a speed of the vehicle system traveling along the route. The one or more speed sensors are configured to measure one or more non-satellite-based input speeds of the vehicle system as the vehicle system travels along the route. The one or more non-satellite-based input speeds are representative of speeds at which one or more wheels of the vehicle system rotate as the vehicle system travels along the route. The one or more inverter controllers are configured to control speeds at which at least first and second axles of the vehicle system are rotated by at least first and second respective motors. The vehicle controller also is configured to determine a first vehicle reference speed and a second vehicle reference speed. The first vehicle reference speed is selected from a group of input speeds that includes at least one of the non-satellite-based input speeds and an estimated velocity of the vehicle system that is derived from the satellite-based input speed. The second vehicle reference speed is selected from the one or more non-satellite-based input speeds. The one or more inverter controllers also are configured to concurrently control the speed at which the first axle is rotated by the first motor based on a throttle setting of the vehicle system and the first vehicle reference speed and to control the speed at which at least the second axle of the vehicle system is rotated by the second motor based on the throttle setting and the second vehicle reference speed.

In one aspect, the vehicle controller is configured to determine the first vehicle reference speed by identifying a selected input speed of the group of input speeds for use as the first vehicle reference speed based on whether the vehicle system is motoring or braking. In one aspect, the selected input speed is identified by the vehicle controller as the input speed in the group that is faster than one or more other input speeds in the group when the vehicle system is braking. In one aspect, the selected input speed is identified by the vehicle controller as the input speed in the group that is slower than one or more other input speeds in the group when the vehicle system is motoring. In one aspect, the vehicle controller obtains the satellite-based input speed by receiving position data signals from one or more global positioning system (GPS) satellites and determining the satellite-based input speed from the position and/or velocity data signals.

In one aspect, the vehicle controller is configured to determine an uncertainty parameter of the satellite-based input speed that is indicative of a potential difference between the satellite-based input speed and the actual speed of the vehicle system and to calculate the estimated velocity of the vehicle system using the uncertainty parameter and a tractive effort generated by the vehicle system. In an embodiment, a method includes deriving a first input speed of a vehicle having at least first and second axles and traveling along a route from position data obtained by a global positioning system (GPS) receiver, deriving at least a second input speed of the vehicle from a wheel speed of one or more wheels joined to the second axle of the vehicle as the vehicle travels along the route, and controlling a first speed at which the first axle of the vehicle is rotated to propel the vehicle using a first vehicle reference speed. The first vehicle reference speed is selected from a first group of input speeds that includes the first input speed and the at least a second input speed. The method may include controlling a second speed at which the second axle of the vehicle is concurrently rotated to propel the vehicle using a second vehicle reference speed. The second vehicle reference speed is obtained from a second group of input speeds that excludes the first input speed.

In one aspect, the first input speed represents an estimated velocity of the vehicle that is calculated from at least a tractive effort generated by the vehicle to propel the vehicle and an uncertainty parameter of the position and/or velocity data. The uncertainty parameter is representative of a potential error between the estimated velocity and an actual speed at which the vehicle is moving along the route. In one aspect, the first vehicle reference speed is selected as the input speed that is slower than one or more other input speeds in the first group of input speeds when the vehicle is generating the tractive effort to propel the vehicle. In one aspect, the first vehicle reference speed is selected as the input speed that is faster than one or more other input speeds in the first group of input speeds when the vehicle is generating braking effort to slow or stop movement of the vehicle. In one aspect, the first input speed represents an upper limit on an estimated velocity of the vehicle as calculated from the position data. The first vehicle reference speed is selected as the input speed in the first group of input speeds that is slower of the upper limit on the estimated velocity and the at least a second input speed when the vehicle is motoring. In one aspect, the first input speed represents a lower limit on an estimated velocity of the vehicle as calculated from the position data. The first vehicle reference speed is selected as the input speed in the first group of input speeds that is faster of the lower limit on the estimated velocity and the at least a second input speed when the vehicle is braking. In one aspect, at least one of the deriving the first input speed, deriving the at least a second speed, controlling the first speed, or controlling the second speed is performed by one or more processors.

In one aspect, the controller may provide to a display device one or more of a location of the vehicle system along a route; a determined speed limit for the vehicle system for at least a segment of the route; an optimal speed of the vehicle system based on fuel consumption, equipment wear, arrival time, or an engine emission rate; the reference speed of the vehicle system; a scale factor that determines a current wheel size when applied to a static reference wheel size based at least in part on differential values of the off-board-based input speed and the onboard-based input speed; a current wheel size for one or more wheels of the vehicle system; a wheel creep for one or more wheels of the vehicle system; a torque value as applied by one or more motors of the vehicle system; or a rotational speed of one or more motors or axles of the vehicle system.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:
1. A method comprising:
    determining a first vehicle reference speed of a vehicle system that is capable of traveling along a route using an off-board-based input speed and an onboard-based input speed, the off-board-based input speed representative of a first moving speed of the vehicle system and determined from data received from an off-board device the onboard-based input speed representative of a second moving speed of the vehicle system and determined from data obtained from an onboard device;

controlling at least one of torque applied by or rotational speed of one or more motors of the vehicle system based at least in part on the first vehicle reference speed;

determining an uncertainty parameter of the off-board-based input speed, the uncertainty parameter representative of a potential inaccuracy of the off-board-based input speed and of a range of potential actual speeds of the vehicle system, the uncertainty parameter derived from the data received from the off-board-based input device;

modifying the off-board-based input speed using the onboard-based input speed responsive to determining that the onboard-based input speed is within the range of potential actual speeds that is represented by the uncertainty parameter;

controlling a rotational speed at which a first axle of the vehicle system is rotated by a first motor of the one or more motors based on a throttle setting of the vehicle system and a second vehicle reference speed determined from a group of input speeds that includes an onboard-based input speed and an off-board-based input speed; and controlling a rotational speed at which at least a second axle of the vehicle system is rotated by a second motor based on the throttle setting and a second vehicle reference speed determined from the onboard-based input speed, wherein the rotational speeds of the first axle and the at least second axle are controlled based on the respective first and second vehicle reference speeds.

2. The method of claim 1, further comprising controlling a speed of rotation of one or more axles of the vehicle system based at least in part on the first vehicle reference speed.

3. The method of claim 1, further comprising calculating the wheel creep using the first vehicle reference speed and the speed of rotation of the one or more axles of the vehicle system.

4. The method of claim 1, further comprising calculating a scale factor that determines a current wheel size when applied to a static reference wheel size.

5. The method of claim 1, wherein the off-board-based input speed is obtained or calculated several different times, and further comprising determining an estimated reference speed during time periods between the different times at which the off-board-based input speed is obtained or calculated and controlling the at least one of torque applied by or rotational speed of the one or more motors using the estimated reference speed during the time periods between the different times at which the off-board-based input speed is obtained or calculated.

6. The method of claim 5, further comprising extrapolating from the first vehicle reference speed and using at least one of the mass of the vehicle system, the resistive force exerted on the vehicle system, or previous tractive efforts applied by the one or more motors to determine the estimated reference speed.

7. The method of claim 1, wherein determining the first vehicle reference speed is performed down to zero vehicle speed with no minimum speed threshold value.

8. The method of claim 1, further comprising determining the first vehicle reference speed by identifying, based on whether the vehicle system is motoring or braking, a selected input speed of the group of input speeds for use as the first vehicle reference speed.

9. The method of claim 8, wherein the selected input speed is identified as the input speed in the group that is faster than one or more other input speeds in the group when the vehicle system is braking.

10. The method of claim 1, wherein the selected input speed is identified as the input speed in the group that is slower than one or more other input speeds in the group when the vehicle system is motoring.

11. A vehicle control system comprising:

a vehicle controller configured to calculate a first vehicle reference speed of a vehicle system based at least in part on both an off-board-based input speed and an onboard-based input speed, wherein, based at least in part on the first vehicle reference speed, the vehicle controller also is configured to one or more of control torque applied by one or more motors of the vehicle system, or control rotational speed of one or more motors or axles of the vehicle systems wherein the vehicle controller also is configured to:

determine an uncertainty parameter of the off-board-based input speed, the uncertainty parameter representative of a potential inaccuracy of the off-board-based input speed and of a range of potential actual speeds of the vehicle system, the uncertainty parameter derived from the data received from the off-board-based input device;

modify the off-board-based input speed using the onboard-based input speed responsive to determining that the onboard-based input speed is within the range of potential actual speeds that is represented by the uncertainty parameter;

controlling a rotational speed at which a first axle of the vehicle system is rotated by a first motor of the one or more motors based on a throttle setting of the vehicle system and a second vehicle reference speed determined from a group of input speeds that includes an onboard-based input speed and an off-board-based input speed; and controlling a rotational speed at which at least a second axle of the vehicle system is rotated by a second motor based on the throttle setting and a second vehicle reference speed determined from the onboard-based input speed, wherein the rotational speeds of the first axle and the at least second axle are controlled based on the respective first and second vehicle reference speeds.

12. The vehicle control system of claim 11, wherein the vehicle controller is configured to control a speed of rotation of one or more axles of the vehicle system based on the vehicle reference speed.

13. The vehicle control system of claim 12, wherein the vehicle controller is configured to calculate the wheel creep using the vehicle reference speed and the speed of rotation of the one or more axles of the vehicle system for a value of the vehicle reference speed of zero.

14. The vehicle control system of claim 11, wherein the vehicle controller is configured to dynamically calculate a scale factor that determines a current wheel size when applied to a static reference wheel size based at least in part on differential values of the off-board-based input speed and the onboard-based input speed.

15. The vehicle control system of claim 11, wherein the off-board input speed is obtained or calculated at several different times, and the vehicle controller is configured to determine an estimated reference speed during time periods between the different times at which the off-board-based input speed is obtained or calculated.

16. The vehicle control system of claim 15, wherein the vehicle controller is configured to determine the estimated reference speed by extrapolating from previously determined vehicle reference speeds and using at least one of the mass of the vehicle system, the resistive force exerted on the vehicle system, or previous tractive efforts applied by the one or more motors.

17. The vehicle control system of claim 11, wherein the vehicle controller is configured to provide to a display device one or more of:
- a location of the vehicle system along a route;
- a determined speed limit for the vehicle system for at least a segment of the route;
- an optimal speed of the vehicle system based on fuel consumption, equipment wear, arrival time, or an engine emission rate;
- the reference speed of the vehicle system;
- a scale factor that determines a current wheel size when applied to a static reference wheel size based at least in part on differential values of the off-board-based input speed and the onboard-based input speed;
- a current wheel size for one or more wheels of the vehicle system;
- a wheel creep for one or more wheels of the vehicle system;
- a torque value as applied by one or more motors of the vehicle system; or
- a rotational speed of one or more motors or axles of the vehicle system.

* * * * *